United States Patent
Moritani et al.

(10) Patent No.: US 11,655,782 B2
(45) Date of Patent: May 23, 2023

(54) VALVE DEVICE

(71) Applicant: DENSO CORPORATION, Kariya (JP)

(72) Inventors: Yuichiro Moritani, Kariya (JP); Hideki Hayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/879,177

(22) Filed: Aug. 2, 2022

(65) Prior Publication Data
US 2023/0041903 A1 Feb. 9, 2023

(30) Foreign Application Priority Data
Aug. 4, 2021 (JP) .............................. JP2021-128439

(51) Int. Cl.
*F02M 26/52* (2016.01)
*F02M 26/22* (2016.01)
*F02M 26/70* (2016.01)

(52) U.S. Cl.
CPC ............ *F02M 26/52* (2016.02); *F02M 26/22* (2016.02); *F02M 26/70* (2016.02)

(58) Field of Classification Search
CPC ......... F02M 26/52; F02M 26/22; F02M 26/70
See application file for complete search history.

(56) References Cited

U.S. PATENT DOCUMENTS

2010/0282222 A1* 11/2010 Ide ........................ F02D 41/10
  123/568.21
2014/0345566 A1  11/2014 Lallemant et al.
2018/0274499 A1*  9/2018 Ueno ................. F02D 41/1448
2019/0264620 A1*  8/2019 Moritani ................ F16K 27/04

OTHER PUBLICATIONS

U.S. Appl. No. 17/879,206, to Shogo Tateishi et al., entitled "Valve Device", filed Aug. 2, 2022 (54 pages).
U.S. Appl. No. 17/879,223, to Hideki Hayashi et al., entitled "Valve Device", filed Aug. 2, 2022 (54 pages).

* cited by examiner

Primary Examiner — Xiao En Mo
(74) Attorney, Agent, or Firm — Nixon & Vanderhye P.C.

(57) ABSTRACT

A valve device increases or decreases a flow rate of EGR gas. The valve device includes a housing, a bypass valve body, and an EGR valve body. The housing includes a first upstream passage into which the EGR gas cooled by an EGR cooler flows, a second upstream passage into which the EGR gas that bypasses the EGR cooler flows, and a downstream passage connected to the first upstream passage and the second upstream passage, and provided downstream with respect to the first upstream passage and the second upstream passage. The bypass valve body opens and closes the second upstream passage. The EGR valve body is provided in the downstream passage and rotates around an EGR valve axis to open and close the downstream passage.

11 Claims, 24 Drawing Sheets

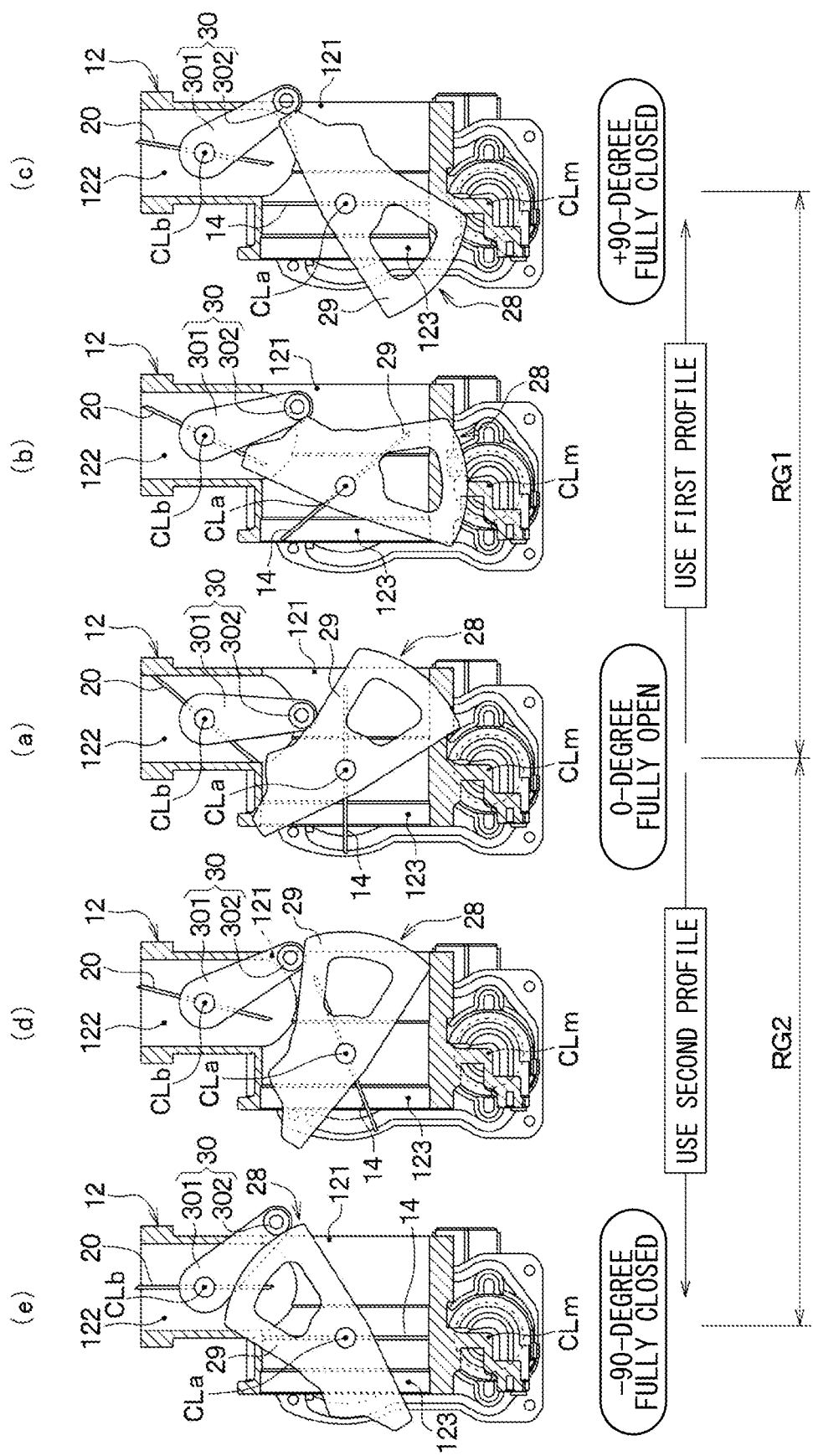

VALVE DEVICE

CROSS REFERENCE TO RELATED APPLICATIONS

This application is based on Japanese Patent Application No. 2021-128439 filed on Aug. 4, 2021, the disclosure of which is incorporated herein by reference.

TECHNICAL FIELD

The present disclosure relates to a valve device that increases or decreases the flow rate of EGR gas.

BACKGROUND

A valve device that includes a first flap and a second flap has been proposed. For example, the first flap and the second flap are valve bodies for opening and closing passages through which a fluid flows. The first flap and the second flap are interlocked with each other by a gear link mechanism including a plurality of mutually meshing gears.

SUMMARY

The present disclosure provides a valve device that increases or decreases a flow rate of EGR gas. The valve device includes a housing, a bypass valve body, and an EGR valve body. The housing includes a first upstream passage into which the EGR gas cooled by an EGR cooler flows, a second upstream passage into which the EGR gas that bypasses the EGR cooler flows, and a downstream passage connected to the first upstream passage and the second upstream passage, and provided downstream with respect to the first upstream passage and the second upstream passage. The bypass valve body opens and closes the second upstream passage. The EGR valve body is provided in the downstream passage and rotates around an EGR valve axis to open and close the downstream passage.

BRIEF DESCRIPTION OF DRAWINGS

The features and advantages of the present disclosure will become more apparent from the following detailed description made with reference to the accompanying drawings. In the drawings:

FIG. 16 is partial cross-sectional views similar to FIG. 2 and corresponding to FIG. 5, and illustrates modes of a valve device that change with the rotational operation of an EGR valve body, in a second embodiment.

DETAILED DESCRIPTION

Figure 1:
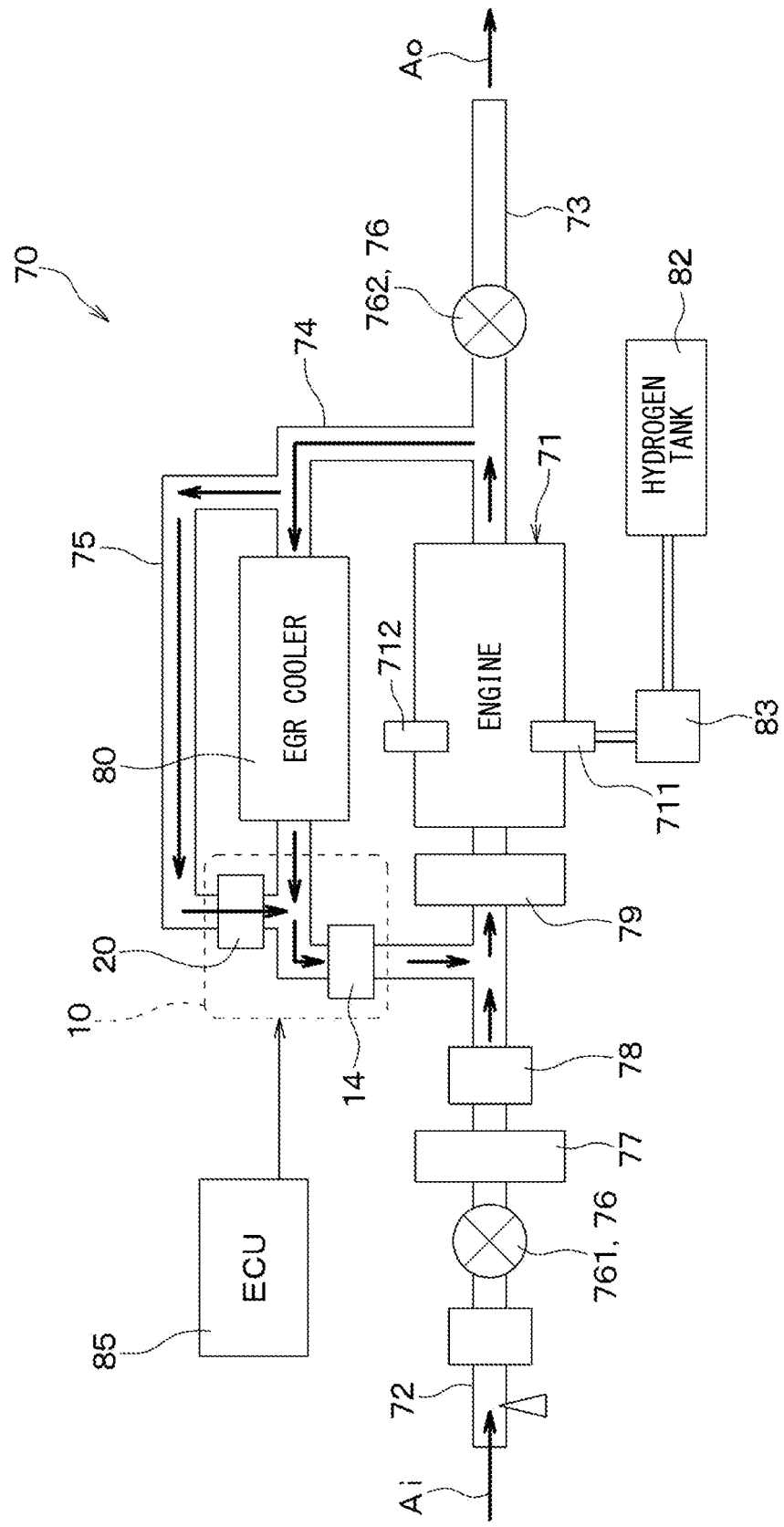
FIG. 1 is a diagram schematically illustrating a schematic configuration of an internal combustion engine system including a valve device in a first embodiment.

For example, in a valve device that includes a first flap and a second flap for opening and closing passages through which a fluid flows, the first flap and the second flap are interlocked via a gear link mechanism. Therefore, in a case where a plurality of gears of the gear link mechanism are meshed with each other, the relationship between the opening degree of a passage opened and closed by the first flap and the opening degree of a passage opened and closed by the second flap is only a linear relationship. In a case where the gears of the gear link mechanism are disengaged, the first flap or the second flap is kept fully closed.

That is, there are considerable restrictions on the relationship between the opening degree of the passage opened and closed by the first flap and the opening degree of the passage opened and closed by the second flap, and it is difficult to flexibly set the relationship between these opening degrees. As a result of detailed studies by the inventors, the above has been found.

The present disclosure provides a valve device capable of flexibly setting a mutual relationship between opening degrees of two passages.

An exemplary embodiment of the present disclosure provides a valve device that increases or decreases a flow rate of EGR gas. The valve device includes a housing, a bypass valve body, an EGR valve body, and an interlocking portion. The housing includes a first upstream passage into which the EGR gas cooled by an EGR cooler flows, a second upstream passage into which the EGR gas that bypasses the EGR cooler flows, and a downstream passage connected to the first upstream passage and the second upstream passage, and provided downstream with respect to the first upstream passage and the second upstream passage. The bypass valve body opens and closes the second upstream passage. The EGR valve body is provided in the downstream passage and rotates around an EGR valve axis to open and close the downstream passage. The interlocking portion interlocks the bypass valve body with a rotational operation of the EGR valve body. The EGR valve body is configured such that a relationship between a rotation amount from a reference rotational position, which is predetermined, and an opening degree of the downstream passage is same in a first case where the EGR valve body rotates around the EGR valve axis from the reference rotational position to one side and a second case where the EGR valve body rotates around the EGR valve axis from the reference rotational position to an other side. The interlocking portion has a structure configured to interlock an opening degree of the second upstream passage with the opening degree of the downstream passage in a non-linear relationship when the second upstream passage and the downstream passage are open.

In the exemplary embodiment of the present disclosure, the interlocking portion can flexibly set the relationship between the opening degree of the second upstream passage opened and closed by the bypass valve body and the opening degree of the downstream passage opened and closed by the EGR valve body.

Hereinafter, each embodiment will be described with reference to the drawings. In each of the following embodiments, the same or equivalent parts are denoted by the same reference numerals in the drawings.

First Embodiment

As illustrated in FIG. 1, in the present embodiment, a valve device 10 constitutes a part of an internal combustion engine system 70 that is a power source for traveling of a vehicle. The internal combustion engine system 70 generates driving force for traveling by igniting hydrogen as fuel and burning the hydrogen. The internal combustion engine system 70 includes the valve device 10, and also includes an engine 71, an intake passage 72, an exhaust passage 73, an EGR passage 74, a bypass passage 75, a turbocharger 76, an intercooler 77, a throttle valve 78, an intake manifold 79, an EGR cooler 80, and a control device 85.

The engine 71 includes an injector 711 and an ignition plug 712 in order to burn hydrogen, which is fuel. The intake passage 72 is connected to the intake side of the engine 71 via the intake manifold 79, and the exhaust passage 73 is connected to the exhaust side of the engine 71.

In the internal combustion engine system 70, fresh air, which is external air, is sucked from the upstream end of the intake passage 72 as indicated by an arrow Ai, and the fresh air is taken into a combustion chamber of the engine 71 from the intake passage 72 via the intake manifold 79. The fuel (specifically, hydrogen) stored in a fuel tank 82 is decompressed by a decompression valve 83 and then supplied to the injector 711 of the engine 71.

The engine 71 ignites and combusts an air-fuel mixture obtained by mixing the fuel injected from the injector 711 and the intake air taken from the intake passage 72 by the ignition plug 712 in the combustion chamber, thereby generating the driving force for traveling. The exhaust gas after combustion passes through the exhaust passage 73 and is discharged from the downstream end of the exhaust passage 73 to the outside of a vehicle as indicated by an arrow Ao. In FIG. 1, gas flows in the passages 72, 73, 74, and 75 are indicated by thick arrows.

In the intake passage 72, a compressor 761 of the turbocharger 76, the intercooler 77, and the throttle valve 78 are disposed in order from the upstream side. A turbine 762 of the turbocharger 76 is disposed in the exhaust passage 73.

In the turbocharger 76, an impeller of the compressor 761 and an impeller of the turbine 762 are directly connected to each other, and these impellers rotate integrally. As a result, the turbocharger 76 uses an exhaust gas flow in the exhaust passage 73 to promote the suction of air from the outside to the intake passage 72.

The intercooler 77 cools the air passing through the intercooler 77. The throttle valve 78 increases or decreases the opening degree of the intake passage 72, thereby increasing or decreasing the flow rate of the air flowing through the intake passage 72.

The EGR passage 74 is a gas passage for allowing a part of the exhaust gas discharged from the engine 71 to flow to the intake side of the engine 71 as EGR gas. The upstream end of the EGR passage 74 is connected to a gas-flow downstream side of the engine 71 and a gas-flow upstream side of the turbine 762 in the exhaust passage 73. The downstream end of the EGR passage 74 is connected to a gas-flow downstream side of the throttle valve 78 and a gas-flow upstream side of the intake manifold 79 in the intake passage 72. As a result, the EGR gas flows into the intake passage 72 from the EGR passage 74, and is sucked into the engine 71 through the intake manifold 79 together with the fresh air flowing through the intake passage 72.

The EGR cooler 80 is disposed in the EGR passage 74. The EGR cooler 80 is, for example, a heat exchanger, and cools the EGR gas flowing through the EGR passage 74 by heat exchange between a cooling fluid and the EGR gas.

The bypass passage 75 is a gas passage for allowing the EGR gas to flow while bypassing the EGR cooler 80. The upstream end of the bypass passage 75 is thus connected to a gas-flow upstream side of the EGR cooler 80 in the EGR passage 74. The downstream end of the bypass passage 75 is connected to a gas-flow downstream side of the EGR cooler 80 in the EGR passage 74.

In the present embodiment, as the bypass passage 75 allows the EGR gas to flow while bypassing the EGR cooler 80, the temperature of the EGR gas is controlled to be equal to or higher than the dew point on the gas-flow downstream side of a connecting portion of the EGR passage 74 to which the downstream end of the bypass passage 75 is connected. As a result, generation of condensed water is suppressed on the gas-flow downstream side of the connecting portion. In particular, since the engine 71 of the present embodiment is a hydrogen engine, for example, EGR gas containing about 2.4 times as much water vapor as an existing diesel engine flows into the EGR passage 74 from the exhaust passage 73. Therefore, it is important to suppress generation of condensed water.

The control device 85 includes a microcomputer including a CPU, a ROM, a RAM, and the like (not illustrated), and executes a computer program stored in a semiconductor memory such as a ROM or a RAM, which is a non-transitory tangible recording medium. The control device 85 functions as an engine control device that executes various control related to the engine 71, and executes operation control of, for example, the engine 71, the throttle valve 78, the valve device 10, and the like.

The valve device 10 increases or decreases the flow rate of the EGR gas flowing through the bypass passage 75, and also increases or decreases the flow rate (that is, the EGR flow rate) of the EGR gas flowing from the EGR passage 74 to the intake passage 72. The valve device 10 is thus provided at a passage connecting portion at which the EGR passage 74 and the bypass passage 75 are connected on the gas-flow downstream side of the EGR cooler 80.

Figure 2:
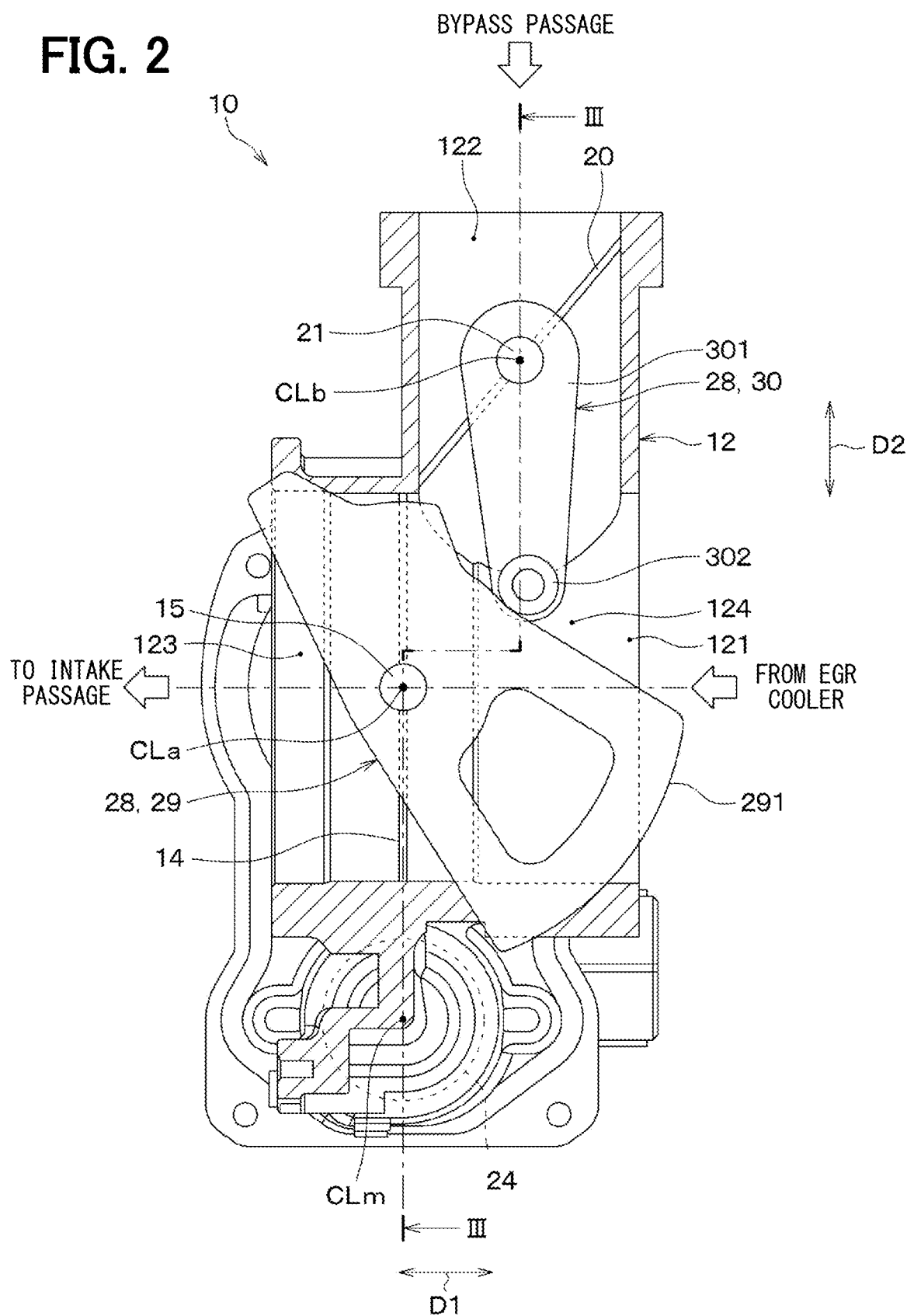
FIG. 2 is a diagram illustrating the valve device of the first embodiment, and is a partial cross-sectional view of a housing of the valve device, taken along a line perpendicular to an EGR valve axis.
Figure 3:
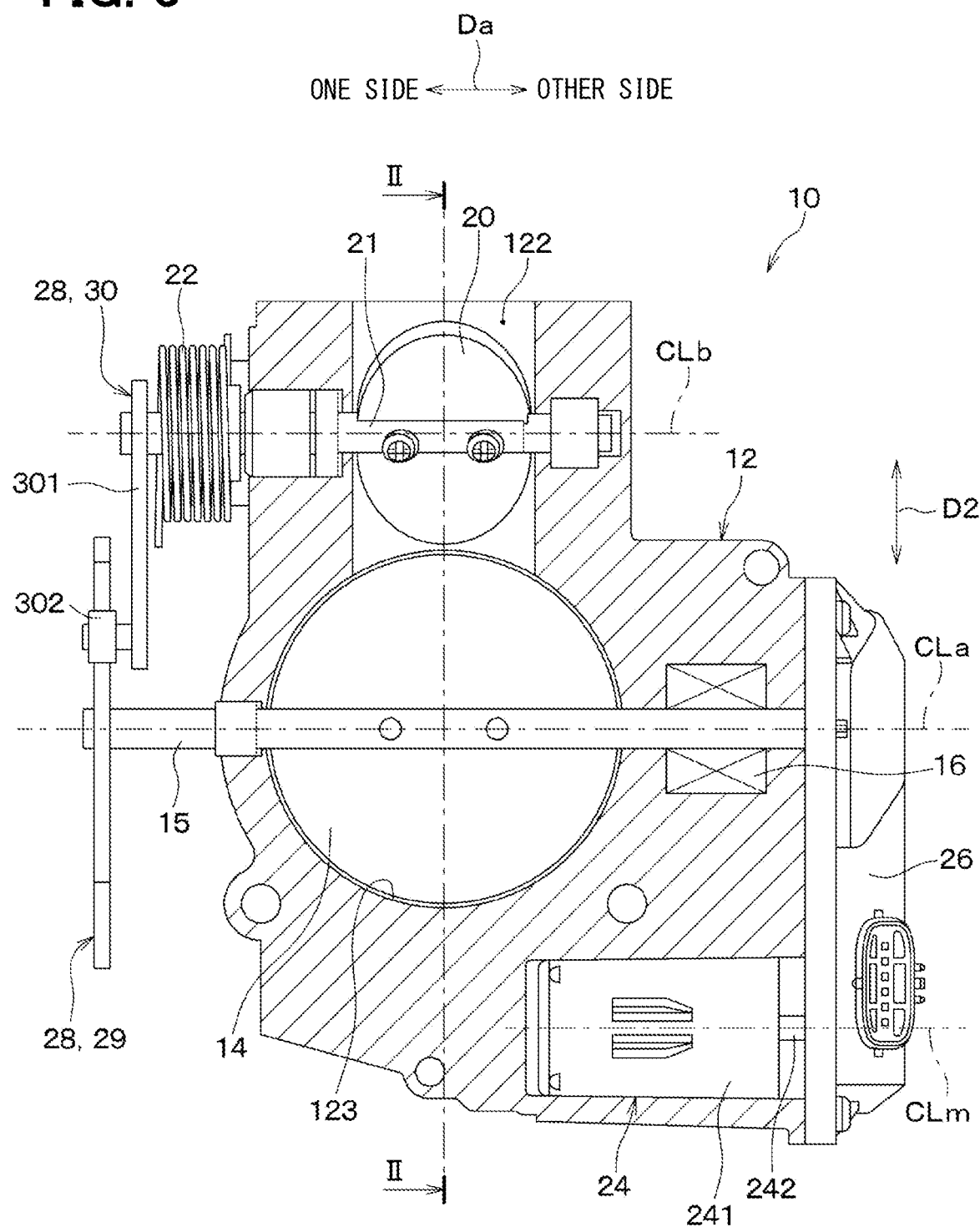
FIG. 3 is a diagram of the valve device of the first embodiment as viewed from a side of a first upstream passage, and is a partial cross-sectional view of the housing of the valve device taken along line III-III in FIG. 2.

As illustrated in FIGS. 2 and 3, the valve device 10 includes a housing 12, an EGR valve body 14, an EGR valve shaft 15, an EGR valve urging portion 16, a bypass valve body 20, a bypass valve shaft 21, a bypass valve urging portion 22, a motor 24, a speed reduction device 26, and an interlocking portion 28. In FIG. 2, the housing 12 is illustrated in a cross-section taken along line II-II in FIG. 3.

As illustrated in FIGS. 1 to 3, the housing 12 forms an outer shell of the valve device 10 and is a non-rotating member that does not rotate. A first upstream passage 121, a second upstream passage 122, a downstream passage 123, and a junction 124 through which EGR gas flows are formed inside the housing 12. That is, the housing 12 is a passage forming portion with the plurality of passages 121, 122, and 123 formed therein.

The first upstream passage 121, the junction 124, and the downstream passage 123 are connected in series from the gas-flow upstream side in the order of the first upstream passage 121, the junction 124, and the downstream passage 123 along a first passage direction D1, and form one linearly extending passage. The first upstream passage 121, the junction 124, and the downstream passage 123 constitute a part of the EGR passage 74 on the gas-flow downstream side of the EGR cooler 80. The EGR gas cooled by the EGR cooler 80 thus flows into the first upstream passage 121. For example, one passage including the first upstream passage 121, the junction 124, and the downstream passage 123 has a circular shape in a cross-section perpendicular to the first passage direction D1.

The second upstream passage 122 includes a downstream end of the bypass passage 75 and constitutes a part of the bypass passage 75. The EGR gas having bypassed the EGR cooler 80 thus flows into the second upstream passage 122.

The second upstream passage 122 is also a passage linearly extending along a second passage direction D2. The second passage direction D2 is a direction intersecting the first passage direction D1, strictly speaking, a direction perpendicular to the first passage direction D1. The second upstream passage 122 is thus disposed in a direction intersecting the first upstream passage 121 and the downstream passage 123.

For example, the second upstream passage 122 has a circular shape in a cross-section perpendicular to the second passage direction D2. The second upstream passage 122 has a smaller diameter than the first upstream passage 121 and the downstream passage 123.

Figure 4:
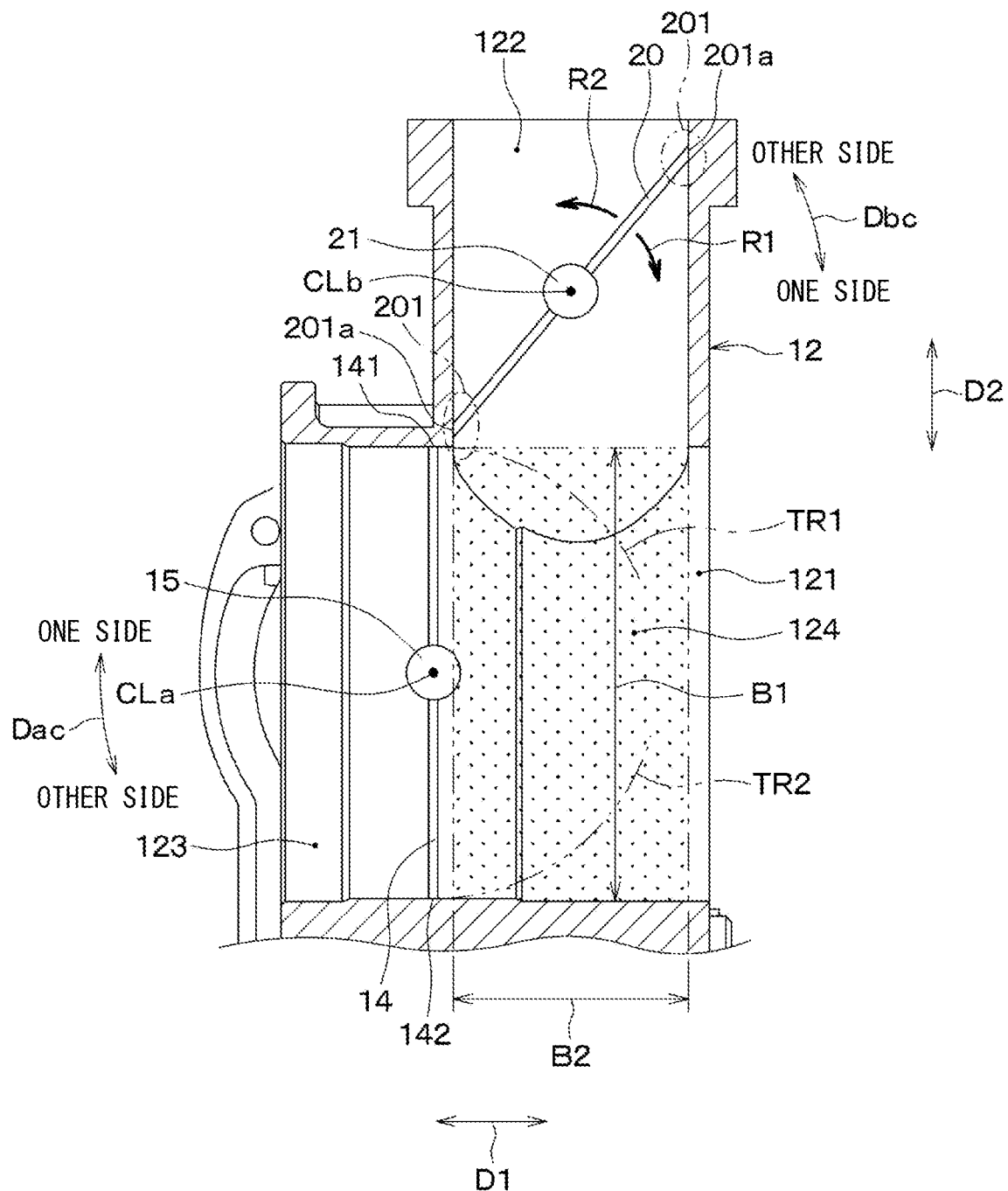
FIG. 4 is a partial cross-sectional view in which an interlocking portion and a part of the housing are omitted from FIG. 2.

As illustrated in FIGS. 2 to 4, the downstream passage 123 is connected to the gas-flow downstream side of the first upstream passage 121 and the second upstream passage 122 via the junction 124. That is, the junction 124 is connected to each of the gas-flow downstream side of the first upstream passage 121, the gas-flow downstream side of the second upstream passage 122, and the gas-flow upstream side of the downstream passage 123. The EGR gas flowing out of the first upstream passage 121 and the EGR gas flowing out of the second upstream passage 122 thus merges and flows into the downstream passage 123.

As illustrated in FIG. 4, the junction 124 is formed as a space in which a space B1 obtained by extending the first upstream passage 121 along the direction of the first upstream passage 121 and a space B2 obtained by extending the second upstream passage 122 along the direction of the second upstream passage 122 overlap each other. The direction of the first upstream passage 121 is the first passage direction D1, and the direction of the second upstream passage 122 is the second passage direction D2. In FIG. 4, dotted hatching is applied to the junction 124.

As illustrated in FIGS. 2 to 4, the EGR valve body 14 is disposed in the downstream passage 123 and rotates around an EGR valve axis CLa. The EGR valve body 14 rotates around the EGR valve axis CLa to open and close the downstream passage 123. The EGR valve axis CLa is an axis along a valve shaft direction Da perpendicular to the first passage direction D1 and the second passage direction D2. The EGR valve axis CLa is located at the center of the width of the downstream passage 123 in the second passage direction D2.

Specifically, the EGR valve body 14 is a butterfly valve body, and for example, is formed in a circular shape conforming to the cross-sectional shape of the downstream passage 123 and in a plate shape along the valve shaft direction Da. The plate shape along the valve shaft direction Da is, in other words, a plate shape with a thickness in a direction perpendicular to the EGR valve axis CLa.

The EGR valve shaft 15 is a rotating shaft rotatably supported by the housing 12. The EGR valve body 14 is fixed to the EGR valve shaft 15 by screwing or the like, and the EGR valve shaft 15 and the EGR valve body 14 integrally rotate about the EGR valve axis CLa. The EGR valve shaft 15 extends from a fixed position of the EGR valve body 14 to each of both sides in the valve shaft direction Da, and is rotatably supported by the housing 12 on each of both sides of the EGR valve body 14 in the valve shaft direction Da.

The EGR valve urging portion 16 functions as a return spring that urges the EGR valve body 14, and includes, for example, one or a plurality of torsion coil springs. The EGR valve urging portion 16 is housed in the housing 12. The EGR valve urging portion 16 constantly urges the EGR valve body 14 via the EGR valve shaft 15 so that the EGR valve body 14 returns to a predetermined reference rotational position. Therefore, when the motor 24 is not energized and is not driven, the EGR valve body 14 is returned to the reference rotational position of the EGR valve body 14 by the urging force of the EGR valve urging portion 16.

The reference rotational position of the EGR valve body 14 in the present embodiment is a rotational position at which the EGR valve body 14 fully closes the downstream passage 123, specifically, a rotational position of the EGR valve body 14 shown in FIGS. 2 to 4. That is, when the EGR valve body 14 is at the reference rotational position, the downstream passage 123 is fully closed.

The fully closed state of the downstream passage 123 means that the opening degree of the downstream passage 123 is 0%, and in the fully closed state of the downstream passage 123, the flow of the EGR gas is blocked in the downstream passage 123 except for the leakage of the EGR gas. The fully open state of the downstream passage 123 means that the opening degree of the downstream passage 123 is 100%, that is, the opening degree of the downstream passage 123 is set to the maximum opening degree within the movable range of the EGR valve body 14. The fully closed and fully open states of the second upstream passage 122 are similar to the fully closed and fully open states of the downstream passage 123.

In the present embodiment, the EGR valve body 14 rotates from the reference rotational position of the EGR valve body 14 to one side or the other side in a circumferential direction Dac of the EGR valve axis CLa. In the description of the present embodiment, the circumferential direction Dac of the EGR valve axis CLa is also referred to as "EGR valve circumferential direction Dac".

The bypass valve body 20 is disposed in the second upstream passage 122 and rotates around a bypass valve axis CLb parallel to the EGR valve axis CLa. The bypass valve body 20 rotates around the bypass valve axis CLb to open and close the second upstream passage 122. The bypass valve axis CLb is located at the center of the width of the second upstream passage 122 in the first passage direction D1.

Specifically, the bypass valve body 20 is a butterfly valve body. When fully closing the second upstream passage 122, the bypass valve body 20 closes the second upstream passage 122 in an inclined attitude with respect to the second upstream passage 122. The inclined attitude of the bypass valve body 20 with respect to the second upstream passage 122 is, in other words, the attitude of the bypass valve body 20 inclined with respect to the second passage direction D2 that is the direction in which the second upstream passage 122 extends. The bypass valve body 20 is thus formed in, for example, an elliptical plate shape along the valve shaft direction Da (in other words, a plate shape with a thickness in a direction perpendicular to the bypass valve axis CLb).

For example, when fully closing the second upstream passage 122 from an open state, the bypass valve body 20 always rotates to one side in the circumferential direction Dbc of the bypass valve axis CLb as indicated by an arrow R1 in FIG. 4. On the other hand, when fully opening the second upstream passage 122 from the fully closed state, the bypass valve body 20 always rotates to the other side in the circumferential direction Dbc of the bypass valve axis CLb as indicated by an arrow R2 in FIG. 4. In the description of the present embodiment, the circumferential direction Dbc of the bypass valve axis CLb is also referred to as "bypass valve circumferential direction Dbc".

The bypass valve shaft 21 is a rotating shaft rotatably supported by the housing 12. The bypass valve body 20 is fixed to the bypass valve shaft 21 by screwing or the like, and the bypass valve shaft 21 and the bypass valve body 20 integrally rotate about the bypass valve axis CLb. The bypass valve shaft 21 extends from a fixed position of the bypass valve body 20 to each of both sides in the valve shaft direction Da, and is rotatably supported by the housing 12 on each of both sides of the bypass valve body 20 in the valve shaft direction Da.

The bypass valve urging portion 22 functions as a return spring that urges the bypass valve body 20, and includes, for example, a torsion coil spring or the like. The bypass valve urging portion 22 is disposed outside the housing 12 and supported by the housing 12. The bypass valve urging portion 22 constantly urges the bypass valve body 20 via the bypass valve shaft 21 so that the bypass valve body 20 rotates to one side in the bypass valve circumferential direction Dbc.

Therefore, when the motor 24 is not energized and is not driven, the bypass valve body 20 is returned to a rotational position (specifically, a rotational position of the bypass valve body 20 illustrated in FIGS. 2 to 4) at which the second upstream passage 122 is fully closed by the urging force of the bypass valve urging portion 22.

The motor 24 is a drive source that rotationally operates the EGR valve body 14 and the bypass valve body 20. The motor 24 is housed in the housing 12, and includes a motor body 241 fixed to the housing 12, a motor shaft 242 that rotates around a motor axis CLm parallel to the EGR valve axis CLa, and a motor rotation sensor (not illustrated) that detects the rotation angle of the motor shaft 242.

The motor 24 rotates the motor shaft 242 based on a signal from the control device 85 in FIG. 1, and outputs a signal indicating the rotation angle of the motor shaft 242 detected by the motor rotation sensor to the control device 85. The rotation angle and the rotation direction of the motor shaft 242 are thus controlled by the control device 85. For example, when rotationally operating the EGR valve body 14 and the bypass valve body 20 against the urging force of the EGR valve urging portion 16 and the bypass valve urging portion 22, the motor 24 generates a torque that overcomes the urging force.

The motor 24 can also keep the rotation angle of the motor shaft 242 as it is by being energized, and when the motor 24 is not energized, the rotation angle of the motor shaft 242 is not kept and the motor shaft 242 can freely rotate.

The motor shaft 242 is connected to the EGR valve shaft 15 via the speed reduction device 26 so as to be capable of transmitting power. The speed reduction device 26 includes a plurality of gears that are always meshed with each other, and decelerates the rotation of the motor shaft 242 and transmits the rotation to the EGR valve shaft 15. The speed reduction device 26 also includes a case constituting a part of the outer shell of the valve device 10, and the gears included in the speed reduction device 26 are housed in the case.

The EGR valve shaft 15 is connected to the interlocking portion 28 so as to be capable of transmitting power on one side in the valve shaft direction Da of the position of the EGR valve shaft 15 fixed to the EGR valve body 14, and is connected to the speed reduction device 26 so as to be capable of transmitting power on the other side in the valve shaft direction Da of the fixed position of the EGR valve body 14. The interlocking portion 28 then connects the EGR valve shaft 15 and the bypass valve shaft 21 so as to be capable of transmitting power. Therefore, the rotational driving force of the motor 24 is transmitted to the motor shaft 242, the speed reduction device 26, the EGR valve shaft 15, the interlocking portion 28, and the bypass valve shaft 21 in this order.

As illustrated in FIGS. 2 and 3, the interlocking portion 28 is an interlocking mechanism that interlocks the bypass valve body 20 with the rotational operation of the EGR valve body 14. Specifically, the interlocking portion 28 of the present embodiment is configured as a cam link mechanism, and includes a cam 29 and a driven rotating portion 30 that is driven by the rotation of the cam 29.

The cam 29 has a flat plate shape with a thickness in the valve shaft direction Da, and is fixed to the EGR valve shaft 15. The cam 29 thus rotates around the EGR valve axis CLa integrally with the EGR valve body 14 and the EGR valve shaft 15. The cam 29 has a cam track 291 formed on a peripheral edge of the cam 29. The cam track 291 is also referred to as "profile of cam 29".

The driven rotating portion 30 includes a lever 301 that is formed in a flat plate shape and has a thickness in the valve shaft direction Da, and a roller 302 as a cam follower rotatably supported by the lever 301. The roller 302 rotates relative to the lever 301 around an axis parallel to the bypass valve axis CLb, and the axis of the roller 302 is disposed to be radially shifted with respect to the bypass valve axis CLb.

The lever 301 is fixed to the bypass valve shaft 21. The lever 301 thus rotates around the bypass valve axis CLb integrally with the bypass valve body 20 and the bypass valve shaft 21.

The bypass valve urging portion 22 urges the bypass valve body 20 fixed to the bypass valve shaft 21 as described above, and also urges the lever 301 fixed to the bypass valve shaft 21. That is, the bypass valve urging portion 22 constantly urges the lever 301 via the bypass valve shaft 21 so that the lever 301 rotates to one side in the bypass valve circumferential direction Dbc (see FIG. 4). As a result, since the roller 302 of the driven rotating portion 30 is constantly pressed against the cam track 291, the driven rotating portion 30 rotates in an interlocking manner with the rotational operation of the cam 29 while causing the roller 302 to follow the cam track 291.

Figure 5:
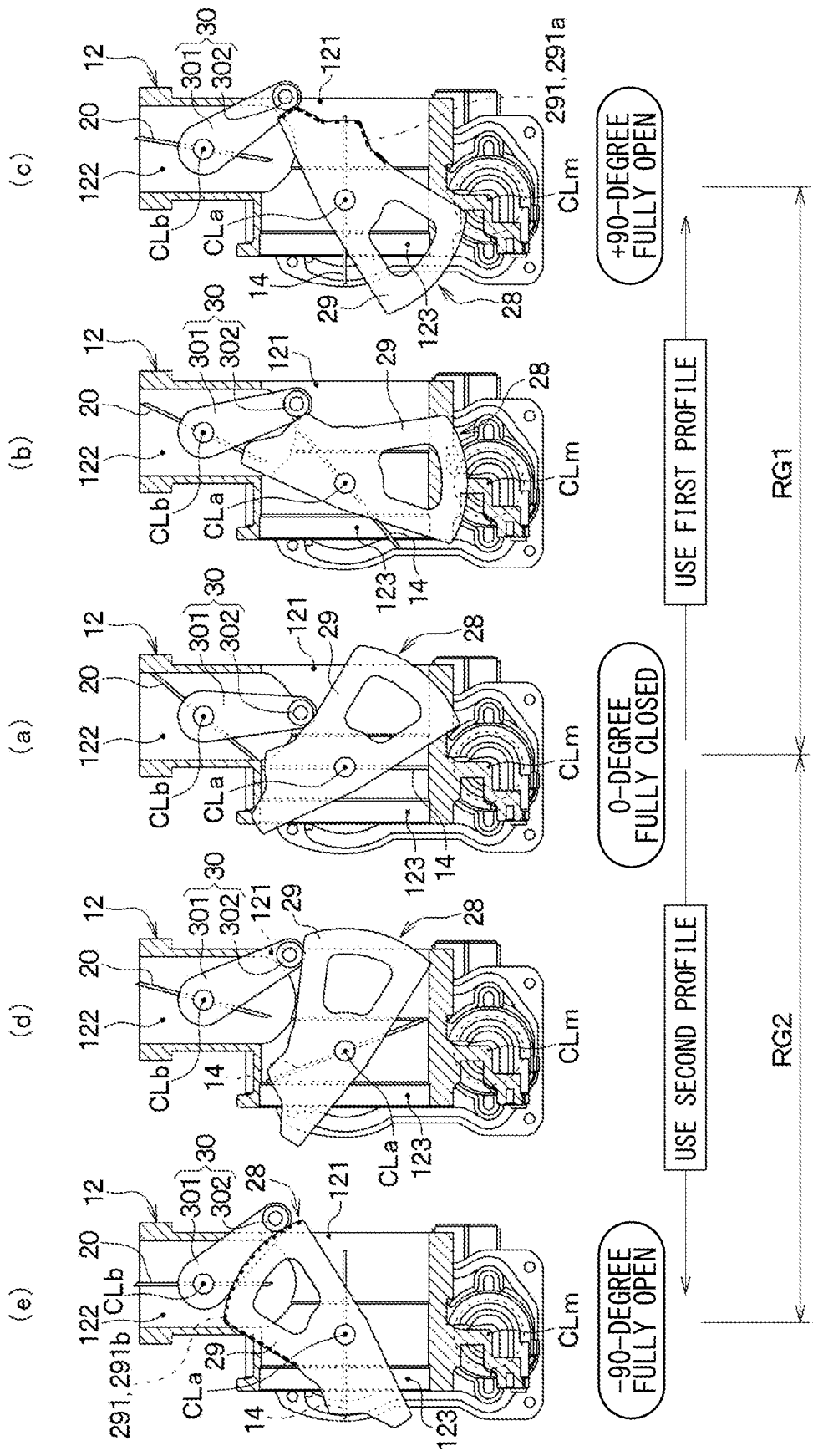
FIG. 5 is partial cross-sectional views similar to FIG. 2 and illustrates modes of the valve device that change with the rotational operation of an EGR valve body.
Figure 6:
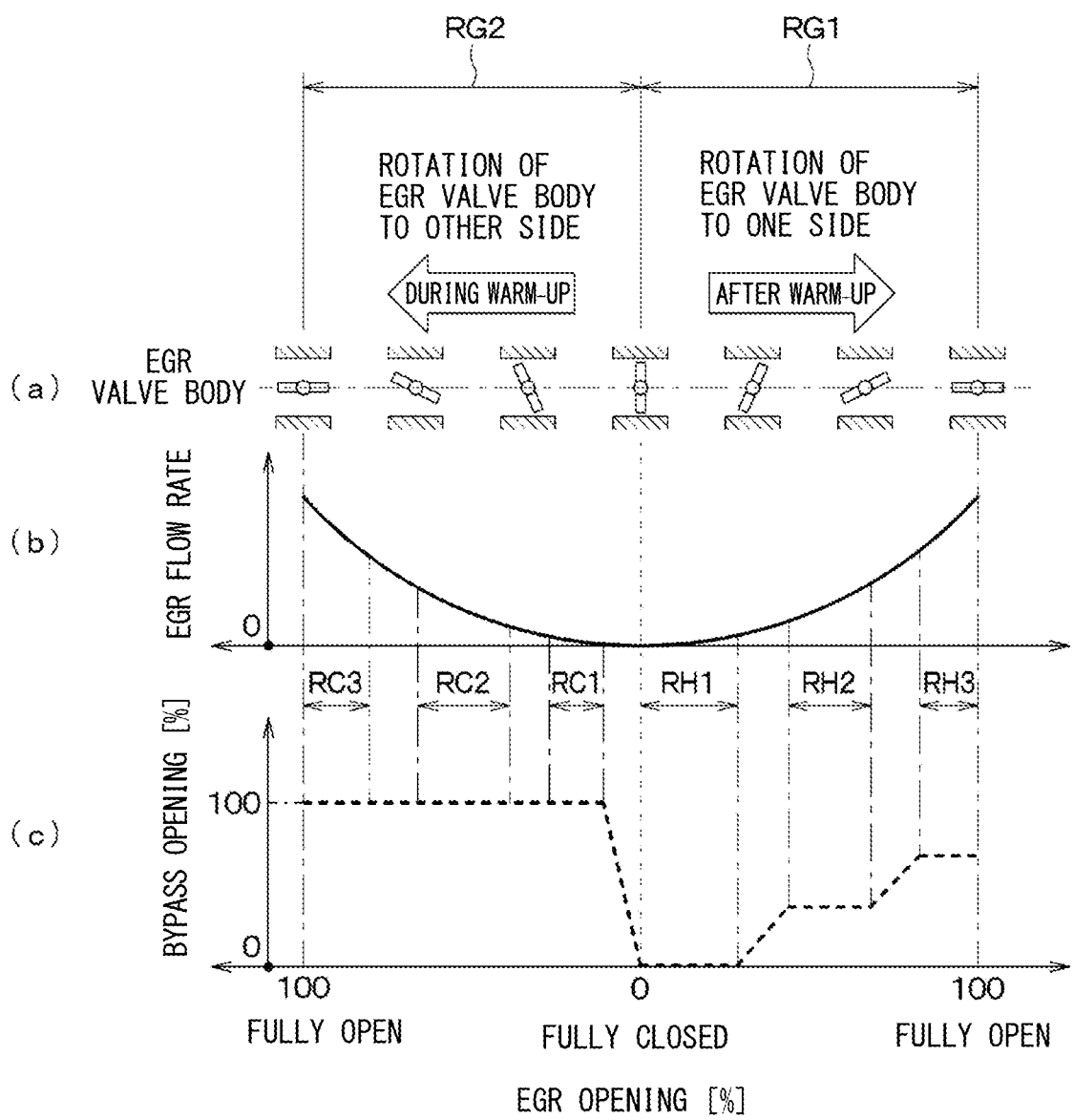
FIG. 6 schematically illustrates an attitude of the EGR valve body that changes with the rotational operation of the EGR valve body, a relationship between an EGR opening degree and an EGR flow rate, and a relationship between the EGR opening degree and a bypass opening degree.

As illustrated in FIGS. 4 to 6, in the present embodiment, the EGR valve body 14 is rotated by the motor 24 within the range of 90 degrees from the reference rotational position of the EGR valve body 14 to one side in the EGR valve circumferential direction Dac and also within the range of 90 degrees from the reference rotational position to the other side in the EGR valve circumferential direction Dac. In the present embodiment, the reference rotational position of the EGR valve body 14 is referred to as "0-degree rotational position of EGR valve body 14". The rotational position obtained by rotating the EGR valve body 14 from the reference rotational position to one side in the EGR valve circumferential direction Dac by 90 degrees is referred to as "+90-degree rotational position", and the rotational position obtained by rotating the EGR valve body 14 from the reference rotational position to the other side in the EGR valve circumferential direction Dac by 90 degrees is referred to as "−90-degree rotational position".

(a) in FIG. 5 illustrates the valve device 10 when the EGR valve body 14 is at the reference rotational position, and (c) in FIG. 5 illustrates the valve device 10 when the EGR valve body 14 is at the +90-degree rotational position. (b) in FIG. 5 illustrates the valve device 10 when the EGR valve body 14 is at an intermediate position between these rotational positions. (e) in FIG. 5 illustrates the valve device 10 when the EGR valve body 14 is at the −90-degree rotational position, and (d) in FIG. 5 illustrates the valve device 10 when the EGR valve body 14 is at an intermediate position between the reference rotational position and the −90-degree rotational position.

As illustrated in (a) to (c) in FIG. 5, in a case where the EGR valve body 14 rotates within a first rotational range RG1, the roller 302 of the driven rotating portion 30 moves relative to the cam 29 along a first profile 291a constituting a part of the cam track 291. That is, in this case, the driven rotating portion 30 rotates in an interlocking manner with the rotational operation of the cam 29 while causing the roller 302 to follow the first profile 291a of the cam 29. The first rotational range RG1 of the EGR valve body 14 is a rotational range from the reference rotational position to the +90-degree rotational position of the EGR valve body 14.

As illustrated in (a), (d), and (e) in FIG. 5, in a case where the EGR valve body 14 rotates within a second rotational range RG2, the roller 302 of the driven rotating portion 30 moves relative to the cam 29 along a second profile 291b constituting a part of the cam track 291. That is, in this case, the driven rotating portion 30 rotates in an interlocking manner with the rotational operation of the cam 29 while causing the roller 302 to follow the second profile 291b of the cam 29. The first profile 291a and the second profile 291b are profiles of the cam 29 connected in series. The second rotational range RG2 of the EGR valve body 14 is a rotational range from the reference rotational position to the −90-degree rotational position of the EGR valve body 14.

As illustrated in (a) in FIG. 5, in a case where the EGR valve body 14 is at the reference rotational position, for example, the downstream passage 123 is fully closed by the EGR valve body 14, and at the same time, the second upstream passage 122 is fully closed by the bypass valve body 20.

Furthermore, as illustrated in (c) and (e) in FIG. 5, the EGR valve body 14 fully opens the downstream passage 123 even in a case where the EGR valve body 14 is at the +90-degree rotational position or at the −90-degree rotational position. As illustrated in (b) in FIG. 6, as the rotation amount (in other words, the rotation angle) of the EGR valve body 14 from the reference rotational position increases, the opening degree of the downstream passage 123 increases, and the EGR flow rate flowing from the downstream passage 123 to the intake passage 72 (see FIG. 1) increases accordingly. The EGR flow rate is the flow rate of the EGR gas flowing from the downstream passage 123 to the intake passage 72.

Specifically, the EGR valve body 14 is configured so that the relationship between the rotation amount from the reference rotational position and the opening degree of the downstream passage 123 is the same in a first case and a second case to be described later. The first case is a case where the EGR valve body 14 rotates from the reference rotational position to one side in the EGR valve circumferential direction Dac, and the second case is a case where the EGR valve body 14 rotates from the reference rotational position to the other side in the EGR valve circumferential direction Dac. One side in the EGR valve circumferential direction Dac is, in other words, one side around the EGR valve axis CLa, and the other side in the EGR valve circumferential direction Dac is, in other words, the other side around the EGR valve axis CLa.

Since the bypass valve body 20 rotates in an interlocking manner with the EGR valve body 14, the opening degree of the second upstream passage 122 (that is, bypass opening degree) is interlocked with the opening degree of the downstream passage 123 (that is, the EGR opening degree) as illustrated in (c) in FIGS. 5 and 6. In the present embodiment, the opening degree of the second upstream passage 122 increases as the rotation amount of the EGR valve body 14 from the reference rotational position increases in any of the first rotational range RG1 and the second rotational range RG2 of the EGR valve body 14.

However, since the shape of the first profile 291a of the cam 29 is different from the shape of the second profile 291b of the cam 29, the relationship between the opening degree of the second upstream passage 122 and the opening degree of the downstream passage 123 that change in an interlocking manner with each other is different between the first case and the second case. For example, in a case where the EGR valve body 14 is at the −90-degree rotational position, the second upstream passage 122 is fully opened, whereas in a case where the EGR valve body 14 is at the +90-degree rotational position, the opening degree of the second upstream passage 122 is smaller than the opening degree in the fully open state.

In the present embodiment, the rotation amount (in other words, the rotation angle) by which the bypass valve body 20 rotates from the fully closed state of the second upstream passage 122 illustrated in (a) in FIG. 5 to the fully open state of the second upstream passage 122 illustrated in (e) in FIG. 5 is, for example, about 40 degrees. The rotation range of the lever 301 is thus smaller than 90 degrees, and specifically, the lever 301 rotates within a rotation range of about 40 degrees.

As illustrated in (c) in FIG. 6, in each of the first rotational range RG1 and the second rotational range RG2 of the EGR valve body 14, the opening degree of the second upstream passage 122 and the opening degree of the downstream passage 123 have a non-linear relationship. For example, focusing on a case where the opening degrees of both the second upstream passage 122 and the downstream passage 123 are not 0%, when both the second upstream passage 122 and the downstream passage 123 are opened, the opening degree of the second upstream passage 122 and the opening degree of the downstream passage 123 have a non-linear relationship.

As described above, the interlocking portion 28 has a structure including the cam 29 and the driven rotating portion 30 as an interlocking structure capable of causing the opening degree of the second upstream passage 122 to be interlocked with the opening degree of the downstream passage 123 in a non-linear relationship when both the second upstream passage 122 and the downstream passage 123 are opened. In short, the interlocking portion 28 interlocks the EGR valve body 14 with the bypass valve body 20 so that the rotation amount of the EGR valve body 14 and the rotation amount of the bypass valve body 20 based on the case where the EGR valve body 14 is at the reference rotational position have a non-linear relationship.

Figure 7:
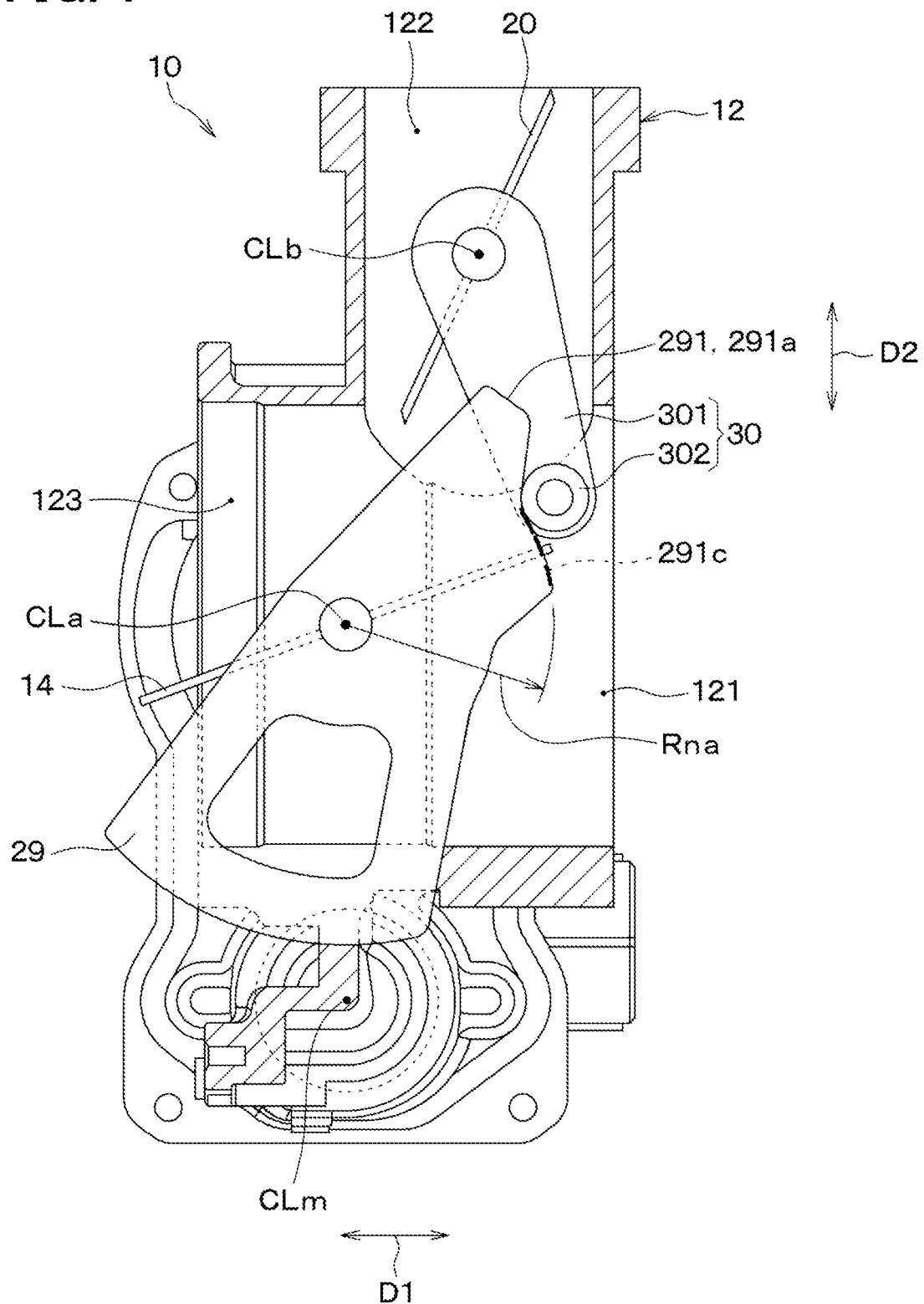
FIG. 7 is a partial cross-sectional view similar to FIG. 2, and is a diagram for explaining a dead zone included in a first profile of a cam.

As illustrated in FIG. 7, the first profile 291a of the cam 29 includes, as a part of the first profile 291a, a dead zone 291c that does not displace the roller 302 of the driven rotating portion 30 with respect to the bypass valve axis CLb even when the cam 29 rotates. Specifically, the dead zone 291c is formed of an arc with a constant radius Rna about the EGR valve axis CLa.

Figure 8:
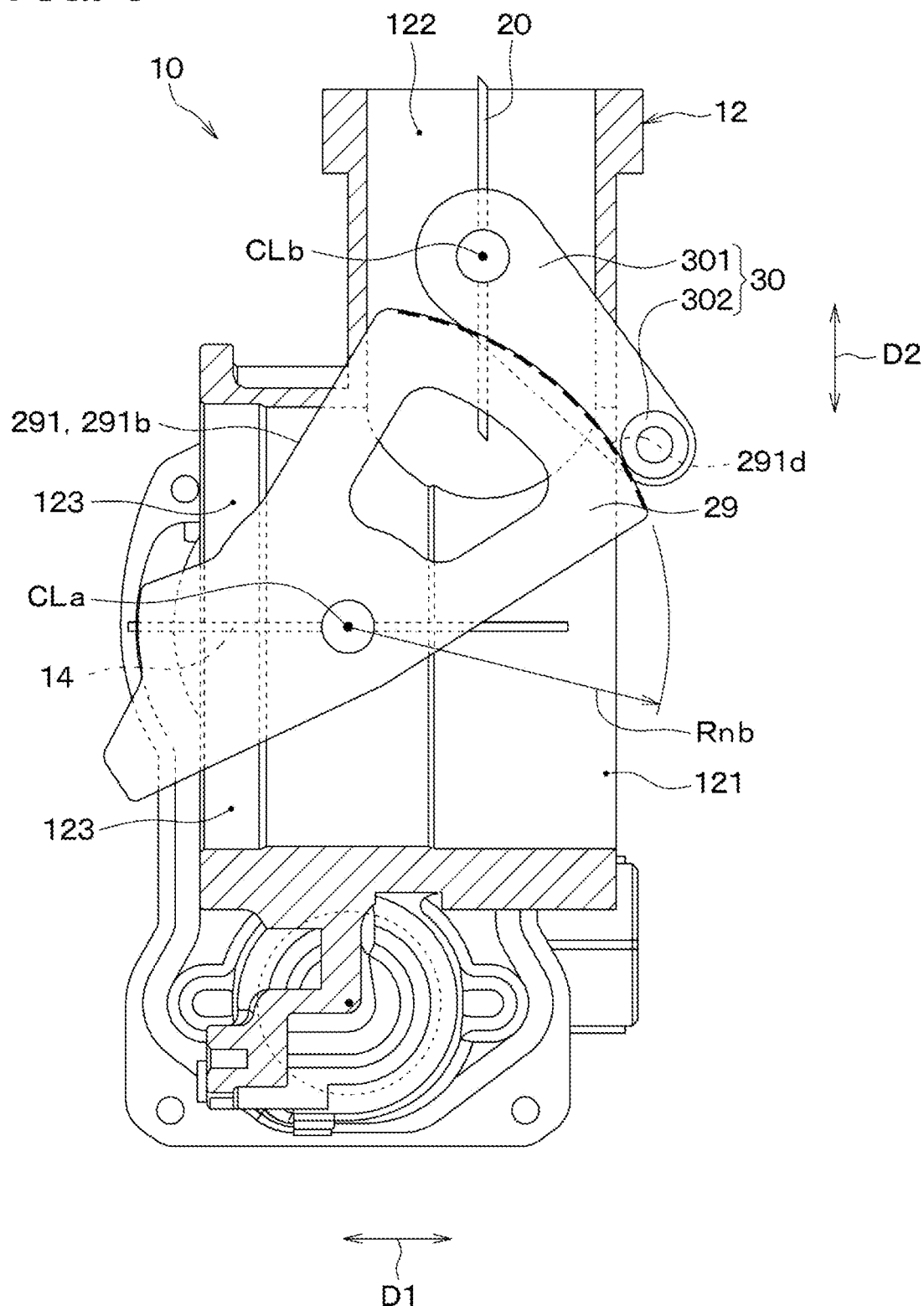
FIG. 8 is a partial cross-sectional view similar to FIG. 2, and is a diagram for explaining a dead zone included in a second profile of the cam.

Similarly, as illustrated in FIG. 8, the second profile 291b of the cam 29 also includes, as a part of the second profile 291b, a dead zone 291d that does not displace the roller 302 of the driven rotating portion 30 with respect to the bypass valve axis CLb even when the cam 29 rotates. The dead zone 291d is formed of an arc with a constant radius Rnb about the EGR valve axis CLa.

As illustrated in FIGS. 5 and 6, in the present embodiment for example, the first rotational range RG1 and the second rotational range RG2 of the EGR valve body 14 are selectively used depending on whether the engine 71 (see FIG. 1) is warming up or has warmed up. That is, after the warm-up of the engine 71, the EGR valve body 14 is rotationally operated within the first rotational range RG1. On the other hand, during the warm-up of the engine 71, the EGR valve body 14 is rotationally operated within the second rotational range RG2. The state after the warm-up of the engine 71 refers to a state where the temperature of the engine 71 is equal to or higher than a warm-up determination temperature set in advance for determining whether the warm-up of the engine 71 is completed, and the engine 71 is operating. The state during the warm-up of the engine 71 refers to as a state where the temperature of the engine 71 is lower than the warm-up determination temperature and the engine 71 is operating.

An after-warm-up first opening degree range RH1 indicated on the horizontal axis in FIG. 6 is a range that can be taken by the EGR opening degree in a low load region after the warm-up of the engine 71, and an after-warm-up second opening degree range RH2 is a range that can be taken by the EGR opening degree in a middle load region after the warm-up of the engine 71. An after-warm-up third opening degree range RH3 is a range that can be taken by the EGR opening degree in a high load range after the warm-up of the engine 71. A warming-up first opening degree range RC1 is a range that can be taken by the EGR opening degree in the low load region during the warm-up of the engine 71, and a warming-up second opening degree range RC2 is a range that can be taken by the EGR opening degree in the middle load region during the warm-up of the engine 71. A warming-up third opening degree range RC3 is a range that can be taken by the EGR opening degree in the high load region during the warm-up of the engine 71.

In FIG. 4, a part of a one end trajectory TR1 followed by one end 141 of the EGR valve body 14 in the radial direction of the EGR valve axis CLa and a part of the other end trajectory TR2 followed by the other end 142 of the EGR valve body 14 in the radial direction of the EGR valve axis CLa are indicated by two-dot chain lines.

As can be seen from these trajectories TR1 and TR2, in a case where the EGR valve body 14 rotates from the reference rotational position illustrated in (a) in FIG. 5 to the +90-degree rotational position illustrated in (c) in FIG. 5, a part including the one end 141 of the EGR valve body 14 enters the junction 124. In a case where the EGR valve body 14 rotates from the reference rotational position illustrated in (a) in FIG. 5 to the −90-degree rotational position illustrated in (e) in FIG. 5, a part including the other end 142 of the EGR valve body 14 enters the junction 124. That is, the EGR valve body 14 is disposed at a position where a part of the EGR valve body 14 temporarily enters the junction 124 when the EGR valve body 14 rotates.

As described above, according to the present embodiment, the valve device 10 includes the interlocking portion 28 that interlocks the bypass valve body 20 with the rotational operation of the EGR valve body 14 as illustrated in FIGS. 2 to 5. The EGR valve body 14 is configured so that the relationship between the rotation amount from the reference rotational position and the opening degree of the downstream passage 123 is the same in the first case and the second case described above. The first case is a case where the EGR valve body 14 rotates from the reference rotational position to one side in the EGR valve circumferential direction Dac, and the second case is a case where the EGR valve body 14 rotates from the reference rotational position to the other side in the EGR valve circumferential direction Dac. As illustrated in (c) in FIG. 6, the interlocking portion 28 has the interlocking structure capable of causing the opening degree of the second upstream passage 122 to be interlocked with the opening degree of the downstream passage 123 in a non-linear relationship when both the second upstream passage 122 and the downstream passage 123 are opened.

With this configuration, the relationship between the opening degree of the second upstream passage 122 opened and closed by the bypass valve body 20 and the opening degree of the downstream passage 123 opened and closed by the EGR valve body 14 can be flexibly set by the interlocking structure of the interlocking portion 28.

In addition, as illustrated in FIGS. 5 and 6, it is easy to make a passage opening degree characteristic, which is the relationship between the opening degree of the second upstream passage 122 and the opening degree of the downstream passage 123, different between the first rotational range RG1 and the second rotational range RG2 of the EGR valve body 14.

Therefore, various passage opening degree characteristics can be freely set, such as reducing the opening degree of the second upstream passage 122 at the time of the fully open state of the downstream passage 123 after the warm-up of the engine 71 to be smaller than that during the warm-up of the engine 71. For example, by reducing the opening degree of the second upstream passage 122 at the time of the fully open state of the downstream passage 123 after the warm-up of the engine 71 to be smaller than that during the warm-up of the engine 71, the cooling performance of the EGR cooler 80 can be maximized after the warm-up of the engine 71.

The exhaust gas from the engine 71 has a low temperature during the warm-up of the engine 71. In this case, as illustrated in FIG. 6, the downstream passage 123 can be opened by the EGR valve body 14, and at the same time, the second upstream passage 122 can be opened by the bypass valve body 20.

As a result, the EGR gas flowing around the EGR valve body 14 in the downstream passage 123 can be warmed to suppress generation of condensed water due to condensation.

For example, in the present embodiment, the bypass opening degree is maximized in any of the opening degree ranges RC1, RC2, and RC3 of the EGR opening degree during the warm-up of the engine 71. As a result, the EGR gas flowing through the downstream passage 123 is maximally warmed, and generation of condensed water is maximally suppressed.

For example, it is assumed that an exhaust gas purification system using urea is provided in the internal combustion engine system 70 (see FIG. 1). In this case, since the exhaust gas purification system using urea cannot be used when the engine 71 has a low temperature and EGR is used instead, it is important to suppress generation of condensed water from the EGR gas during such warm-up of the engine 71.

(1) According to the present embodiment, as illustrated in FIGS. 4 to 6, when the EGR valve body 14 is at the reference rotational position, the EGR valve body 14 fully closes the downstream passage 123. The passage opening degree characteristic that is the relationship between the opening degree of the second upstream passage 122 and the opening degree of the downstream passage 123 that change in an interlocking manner with each other is different between the first case and the second case. As a result, for example, it is possible to selectively use two types of passage opening degree characteristics depending on whether the engine 71 is being warmed up or has been warmed up.

(2) According to the present embodiment, as illustrated in FIGS. 2 and 5, the interlocking portion 28 includes the cam 29 that rotates together with the EGR valve body 14 and includes the cam track 291, and the driven rotating portion 30 that rotates together with the bypass valve body 20 and includes the roller 302. The driven rotating portion 30 rotates in an interlocking manner with the rotational operation of the cam 29 while causing the roller 302 to follow the cam track 291.

It is thus easy to interlock the EGR valve body 14 with the bypass valve body 20 depending on the shape of the cam track 291 so that the rotation amount of the EGR valve body 14 and the rotation amount of the bypass valve body 20 have a non-linear relationship. Therefore, the passage opening degree characteristic can be set more flexibly.

(3) According to the present embodiment, as illustrated in FIG. 4, the EGR valve body 14 is disposed at a position where a part of the EGR valve body 14 temporarily enters the junction 124 when the EGR valve body 14 rotates. Since the EGR valve body 14 and the bypass valve body 20 can be disposed close to each other, the valve device 10 can be downsized.

Figure 9:
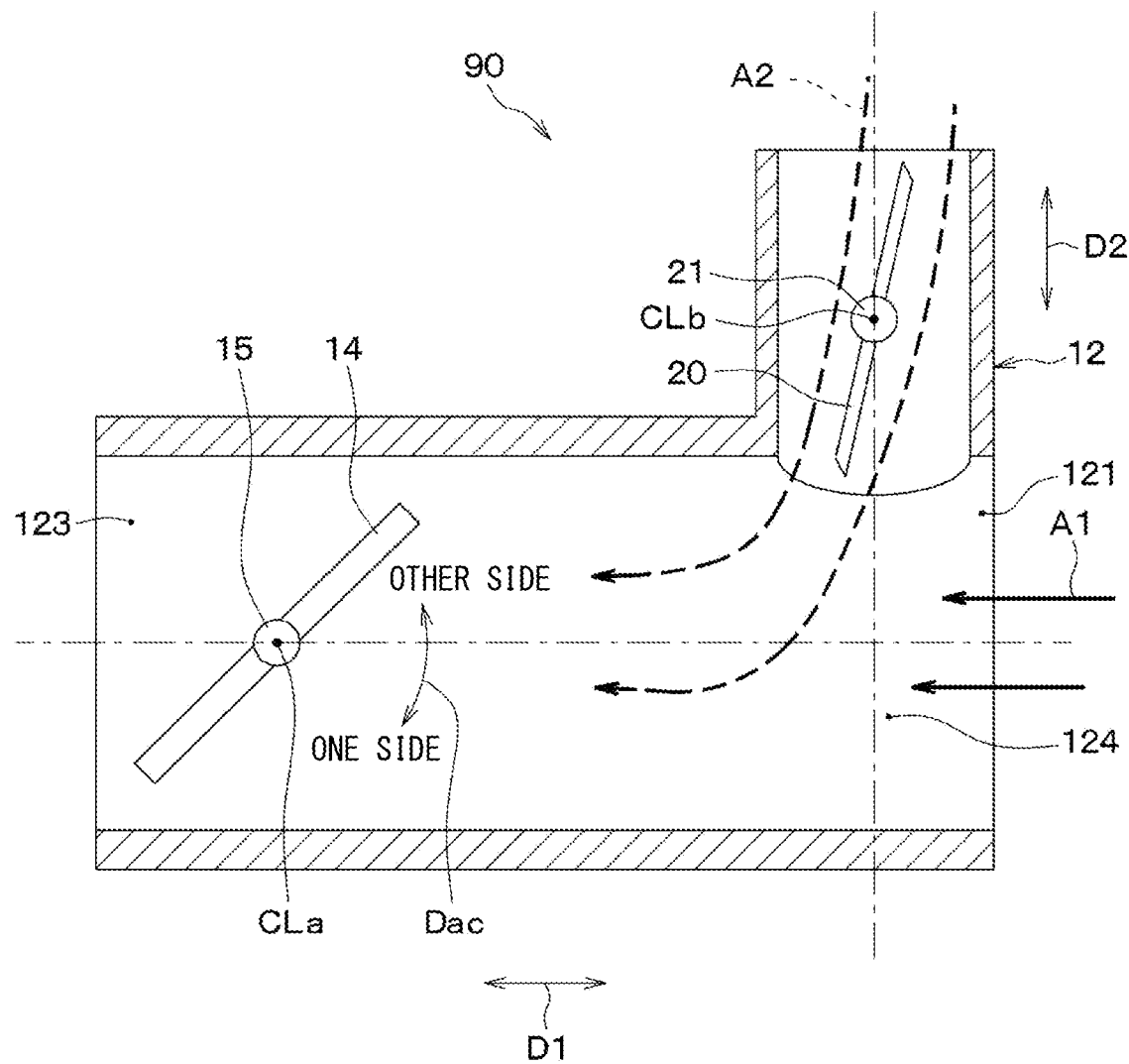
FIG. 9 is a cross-sectional view schematically illustrating a cross-section corresponding to FIG. 4 in a valve device of a first comparative example, and is a diagram illustrating a state where an EGR valve body rotates from a reference rotational position to one side in an EGR valve circumferential direction.
Figure 10:
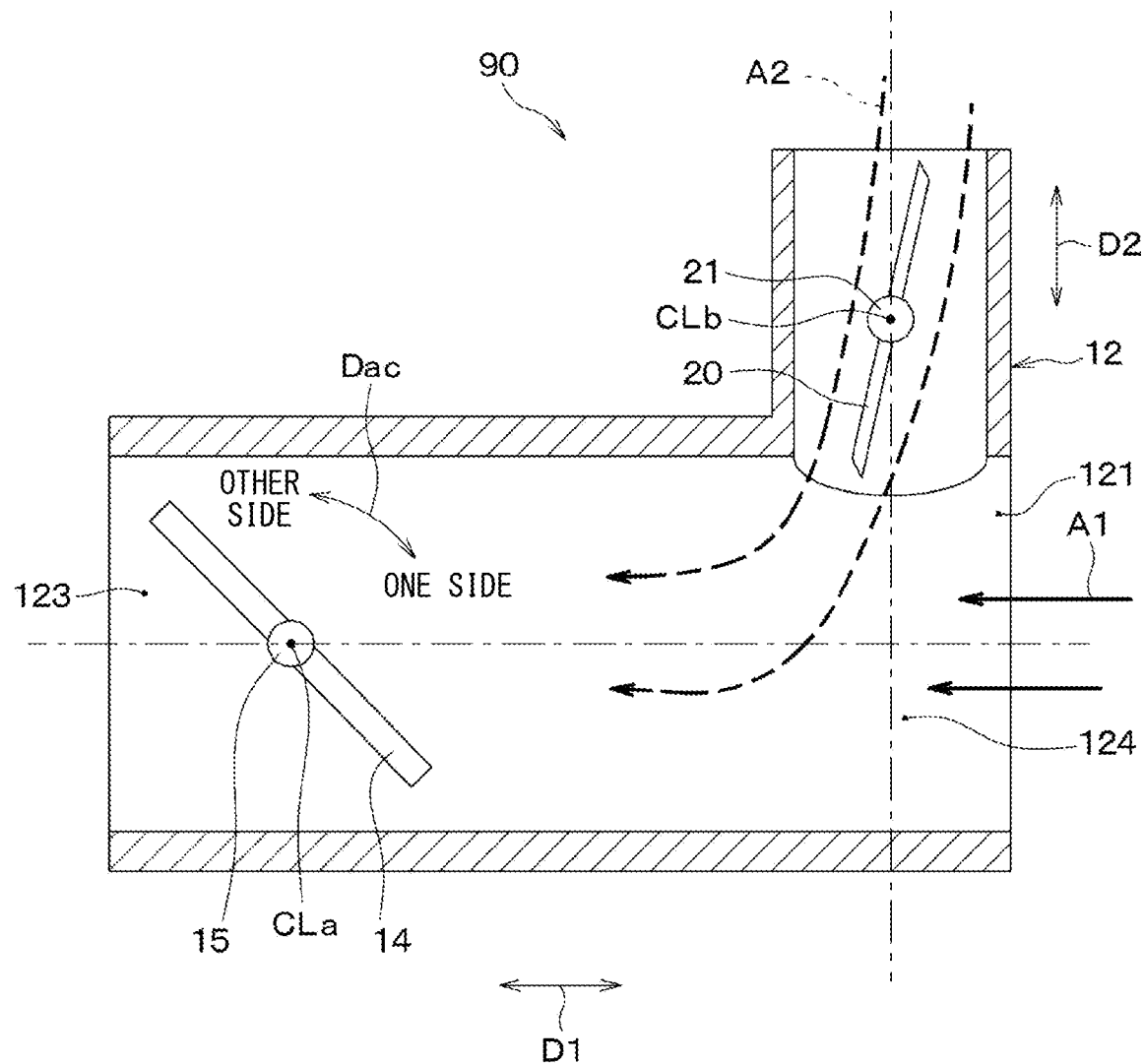
FIG. 10 is a cross-sectional view schematically illustrating the cross-section corresponding to FIG. 4 in the valve device of the first comparative example, and is a diagram illustrating a state where the EGR valve body rotates from the reference rotational position to the other side in the EGR valve circumferential direction.

For example, in a valve device 90 of a first comparative example illustrated in FIGS. 9 and 10, since the EGR valve body 14 is disposed away from the bypass valve body 20 as compared with the valve device 10 of the present embodiment, the EGR valve body 14 of the valve device 90 does not enter the junction 124 at any rotational position. For this reason, in the first comparative example, regardless of whether the EGR valve body 14 rotates from the reference rotational position to one side or the other side in the EGR valve circumferential direction Dac, the direction of rotation does not affect the flow rate of the EGR gas in the downstream passage 123, but the size of the valve device 90 increases. An arrow A1 in FIGS. 9 and 10 indicates an EGR gas flow from the first upstream passage 121 to the junction 124, and an arrow A2 indicates an EGR gas flow from the second upstream passage 122 to the junction 124. The same applies to FIGS. 11 and 12 to be described later.

Figure 11:
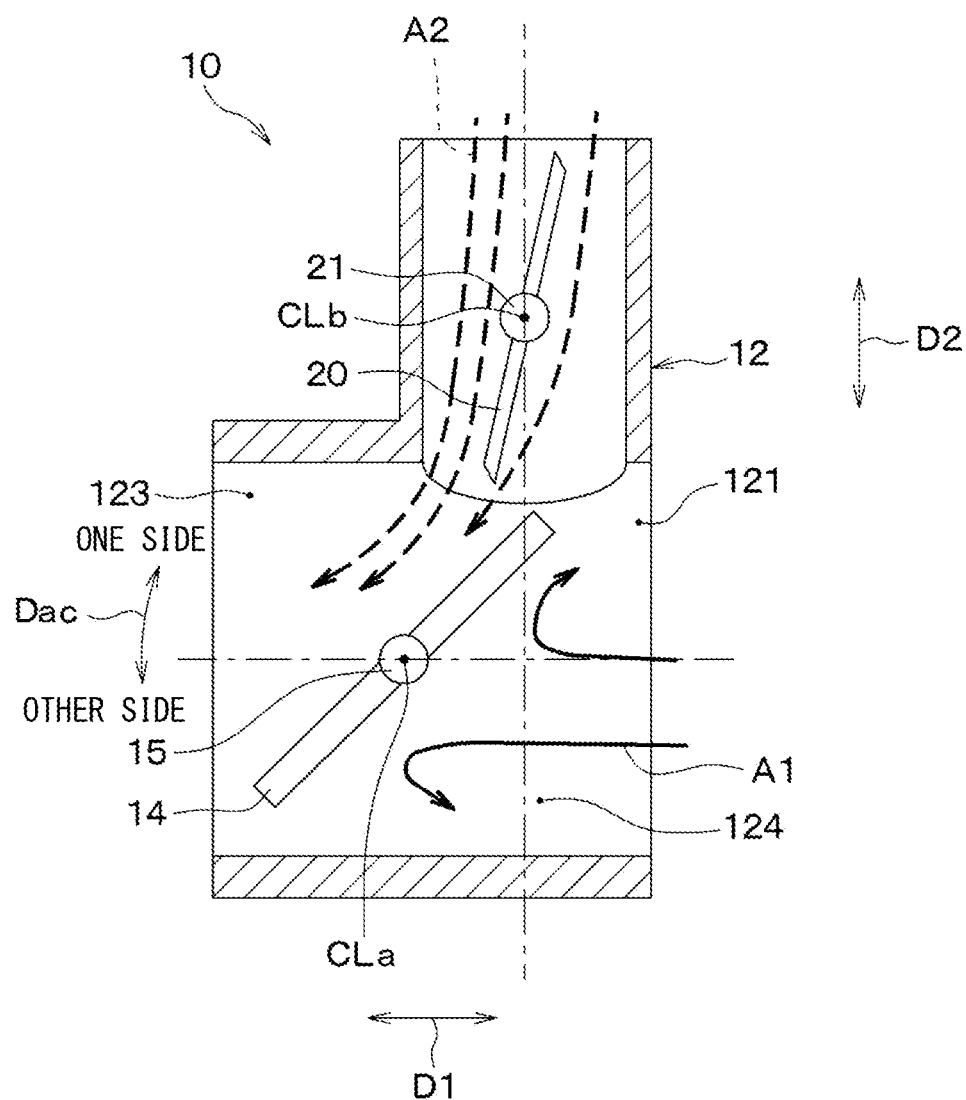
FIG. 11 is a cross-sectional view illustrating a schematic cross-section corresponding to FIG. 9 in the first embodiment.
Figure 12:
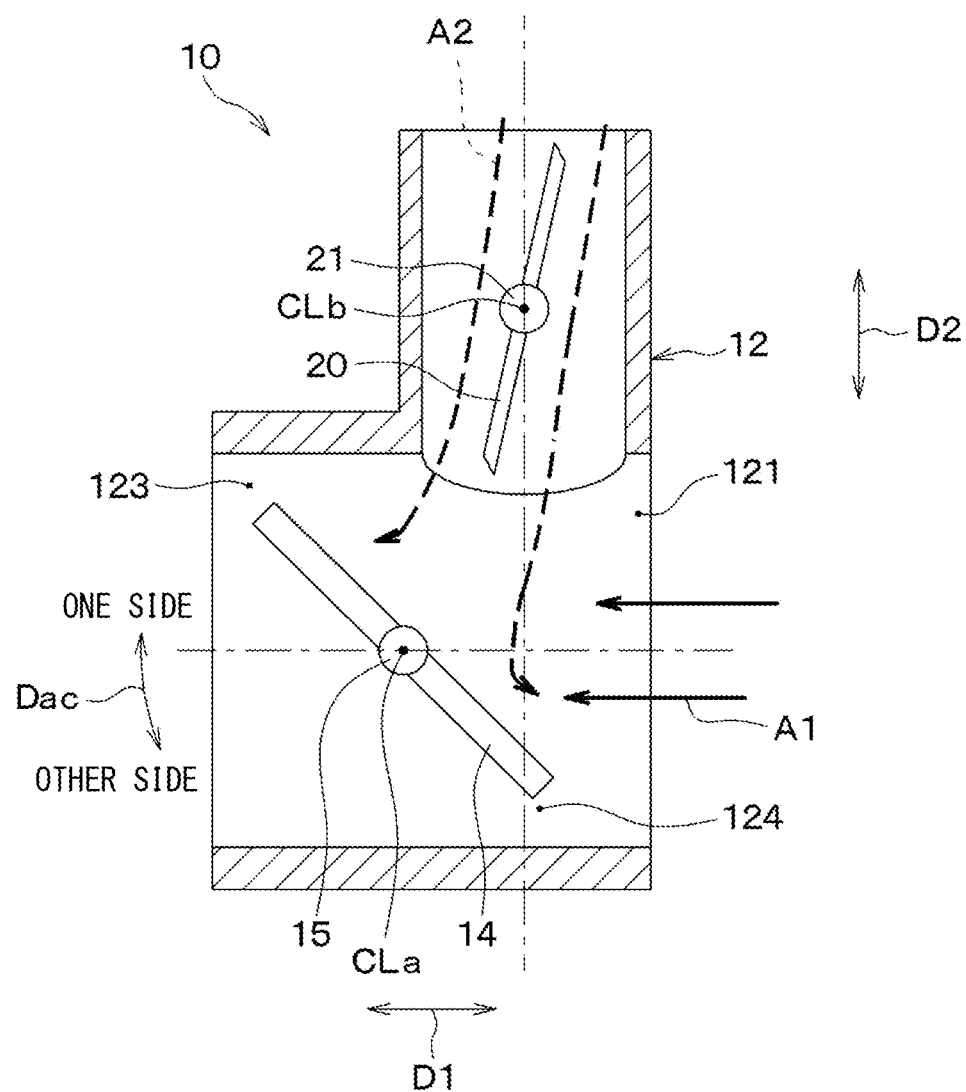
FIG. 12 is a cross-sectional view illustrating a schematic cross-section corresponding to FIG. 10 in the first embodiment.

On the other hand, in the present embodiment, when the EGR valve body 14 rotates as described above, a part of the EGR valve body 14 temporarily enters the junction 124, and thus the size of the valve device 10 can be reduced. However, as illustrated in FIGS. 11 and 12, the direction in which the EGR valve body 14 rotates from the reference rotational position affects the EGR gas flow flowing from each of the first upstream passage 121 and the second upstream passage 122 to the junction 124. The direction in which the EGR valve body 14 rotates from the reference rotational position can thus affect the flow rate (that is, the bypass flow rate) of the EGR gas flowing from the second upstream passage 122 to the junction 124.

In the present embodiment, the interlocking portion 28 adopts the cam link mechanism including the cam 29 and the driven rotating portion 30. As a result, since the passage opening degree characteristic can be flexibly set according to the shape of the cam track 291, the passage opening degree characteristic can be set so as to cancel the influence of the direction in which the EGR valve body 14 rotates on the bypass flow rate. For example, if the opening degree of the downstream passage 123 does not change, the bypass flow rate can be made the same regardless of the direction in which the EGR valve body 14 rotates from the reference rotational position.

As described above, it is possible to obtain the valve device 10 in which the bypass flow rate is easily controlled while downsizing the valve device 10 by the synergistic effect of the arrangement of the EGR valve body 14 and the cam link mechanism.

(4) According to the present embodiment, as illustrated in FIGS. 7 and 8, the cam track 291 includes, as a part of the cam track 291, the dead zone 291c that does not displace the roller 302 of the driven rotating portion 30 with respect to the bypass valve axis CLb even when the cam 29 rotates. For example, the flow rate of the EGR gas flowing from the downstream passage 123 to the intake passage 72 (see FIG. 1) can thus be adjusted by the EGR valve body 14 according to the operating condition of the engine 71, while the opening degree of the second upstream passage 122 is kept. As a result, temperature controllability of the EGR gas flowing to the intake passage 72 can be improved.

For example, in a case where high temperature EGR gas is required, the opening degree of the downstream passage 123 can be changed while the second upstream passage 122 is kept fully open.

(5) According to the present embodiment, when fully closing the opened second upstream passage 122 as illustrated in FIG. 4, the bypass valve body 20 always rotates to one side in the bypass valve circumferential direction Dbc to fully close the second upstream passage 122 as indicated by the arrow R1 in FIG. 4. The bypass valve body 20 of the present embodiment thus has a seal surface 201a that always faces the inner wall surface of the second upstream passage 122 when the second upstream passage 122 is fully closed at both end portions 201 of the bypass valve body 20 in the radial direction of the bypass valve axis CLb.

Figure 13:
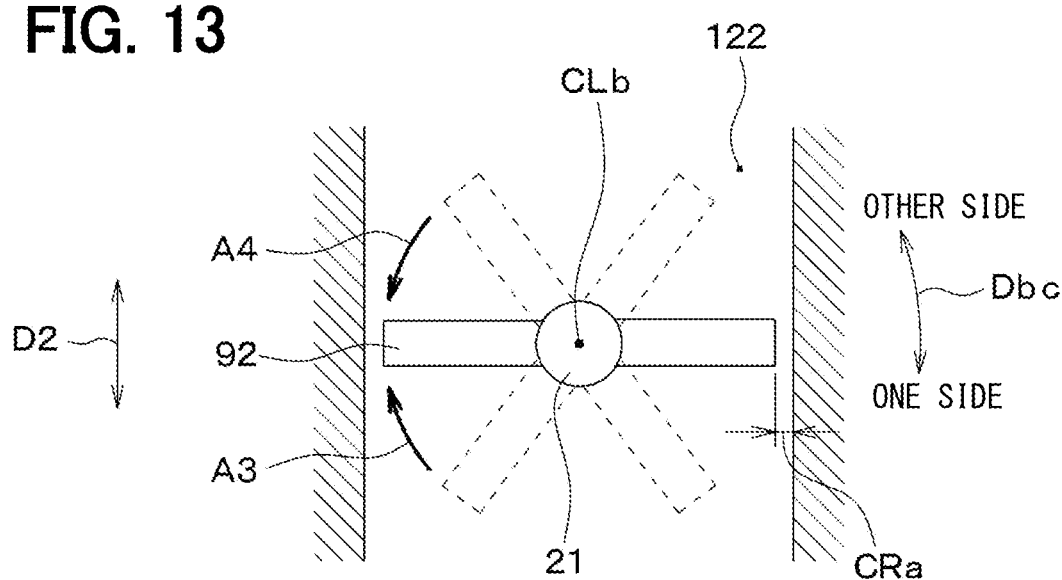
FIG. 13 is a cross-sectional view schematically illustrating a bypass valve body and its periphery in a valve device of a second comparative example.
Figure 14:
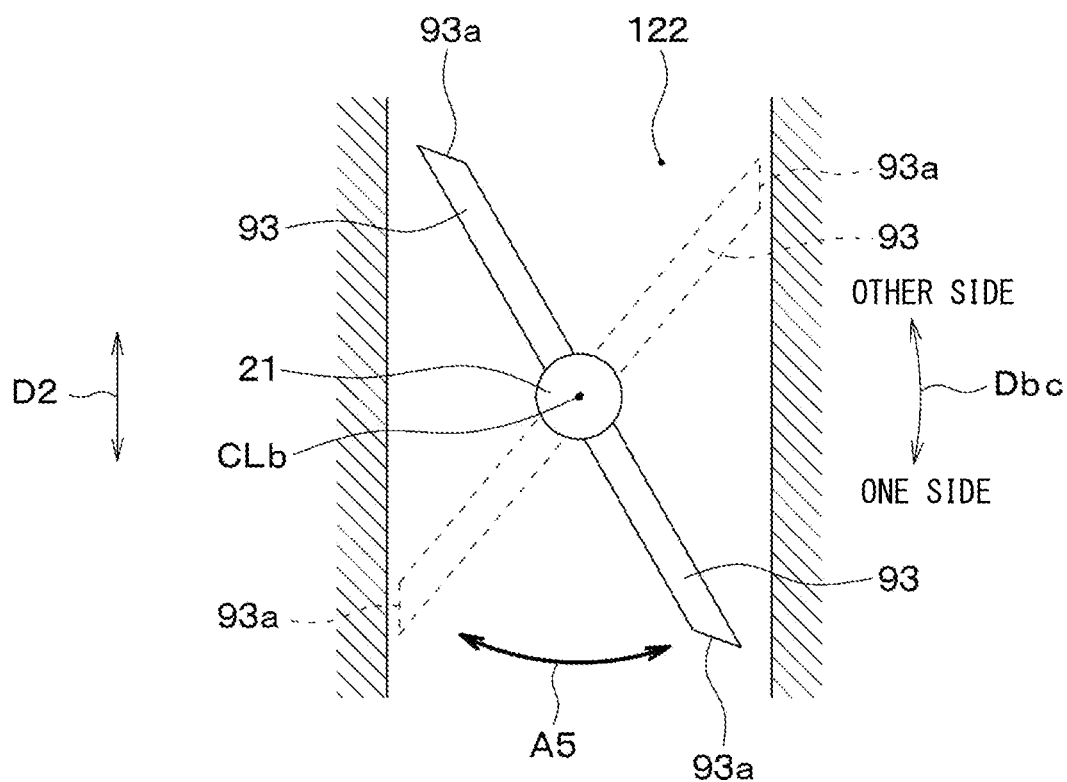
FIG. 14 is a cross-sectional view schematically illustrating a bypass valve body and its periphery in a valve device of a third comparative example.

For example, as compared with a valve device of a second comparative example including a bypass valve body 92 of FIG. 13 or a valve device of a third comparative example including a bypass valve body 93 of FIG. 14, it is possible to reduce the leakage of the EGR gas when the second upstream passage 122 is fully closed. In FIGS. 13 and 14, the state where the bypass valve bodies 92 and 93 indicated by solid lines rotate around the bypass valve axis CLb is indicated by broken lines.

In the second comparative example illustrated in FIG. 13, when fully closing the opened second upstream passage 122, the bypass valve body 92 may rotate to one side in the bypass valve circumferential direction Dbc as indicated by an arrow A3, or may rotate to the other side in the bypass valve circumferential direction Dbc as indicated by an arrow A4. In the second comparative example, a clearance CRa between the bypass valve body 92 and the inner wall surface of the second upstream passage 122 increases when the second upstream passage 122 is fully closed, and the leakage of the EGR gas is large as compared with the present embodiment.

Also in the third comparative example illustrated in FIG. 14, when fully closing the opened second upstream passage 122, the bypass valve body 93 may rotate to one side in the bypass valve circumferential direction Dbc, or may rotate to the other side in the bypass valve circumferential direction Dbc, as indicated by an arrow A5. In the third comparative example, a seal surface 93a provided at an end portion of the bypass valve body 93 may not face the inner wall surface of the second upstream passage 122 when the second upstream passage 122 is fully closed, and thus the leakage of the EGR gas may be large as compared with the present embodiment.

In the second comparative example and the third comparative example, the EGR valve body 14 and the bypass valve bodies 92 and 93 are interlocked via a gear link mechanism including a plurality of gears meshing with each other, for example. In such a gear link mechanism, it is difficult to implement the operation of the bypass valve body 20 of the present embodiment.

(6) According to the present embodiment, as illustrated in FIGS. 2 and 4, the bypass valve body 20 is urged to rotate to one side in the bypass valve circumferential direction Dbc. When fully closing the second upstream passage 122, the bypass valve body 20 closes the second upstream passage 122 in an inclined attitude with respect to the second upstream passage 122. Therefore, for example, as compared with a case where the bypass valve body 20 is perpendicular to the second passage direction D2 when the second upstream passage 122 is fully closed, the rotation angle in a case where the bypass valve body 20 rotates from the fully closed state to the fully open state of the second upstream passage 122 can be reduced. That is, the maximum rotation amount of the lever 301 of the interlocking portion 28 can be reduced, and the cam track 291 can be shortened accordingly. As a result, the interlocking portion 28 can be downsized.

Figure 15:
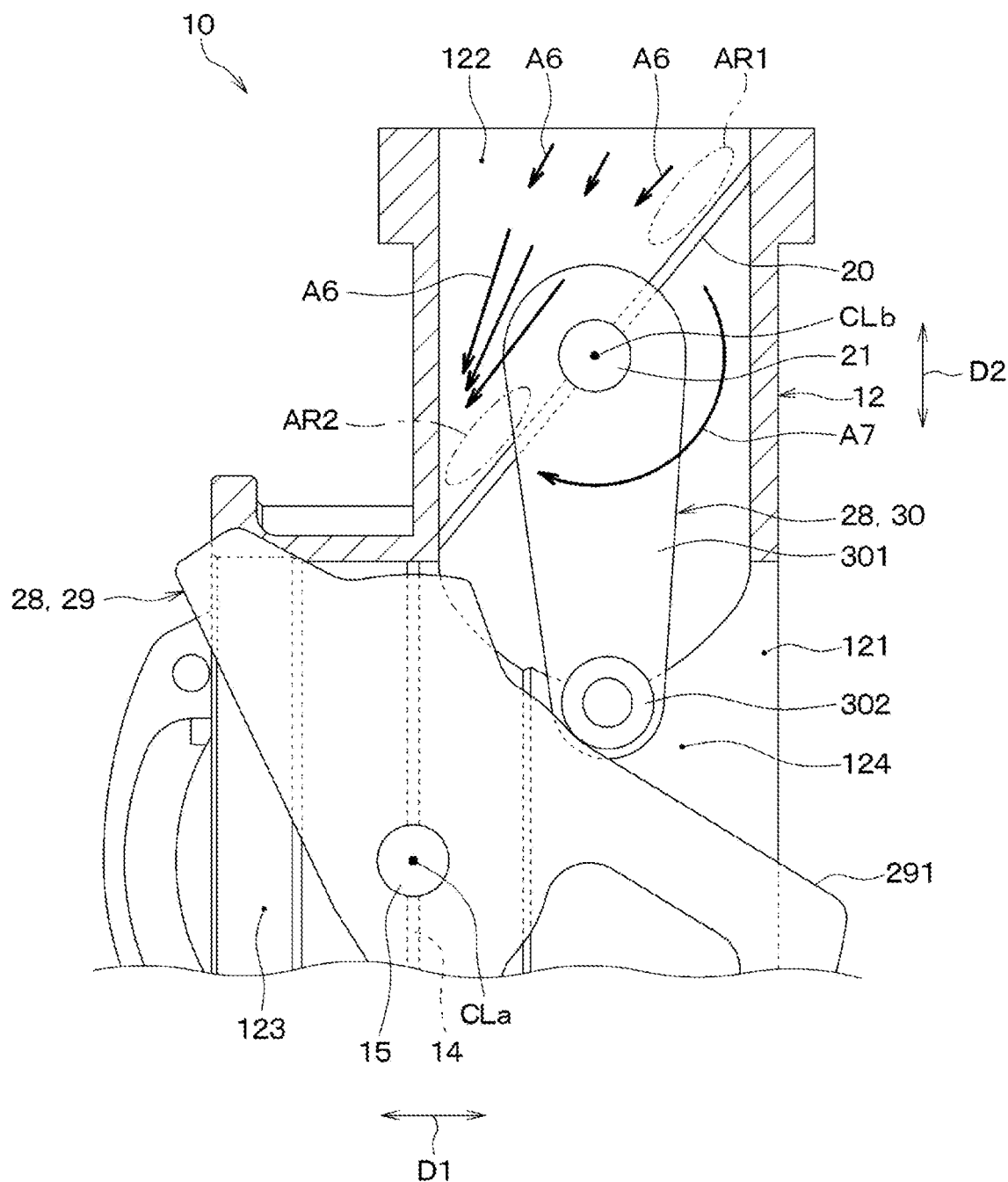
FIG. 15 is a cross-sectional view obtained by extracting a second upstream passage and its periphery from the cross-sectional view of FIG. 2 in the first embodiment.

In addition, since the leakage of the EGR gas does not completely become zero even when the second upstream passage 122 is fully closed, the flow of the EGR gas is narrowed as indicated by arrows A6 on the gas-flow upstream side of the bypass valve body 20 in the second upstream passage 122 as illustrated in FIG. 15. As compared with a gas-flow upstream region AR1 along the bypass valve body 20, the flow velocity of the EGR gas is high and a static pressure is reduced in a gas flow downstream region AR2. As a result, the static pressure difference of the EGR gas in the second upstream passage 122 acts as a torque for rotating the bypass valve body 20 in a direction to close the second upstream passage 122 as indicated by an arrow A7.

For example, as compared with the case where the bypass valve body 20 is perpendicular to the second passage direction D2 when the second upstream passage 122 is fully closed, it is possible to reduce the urging force of the bypass valve urging portion 22 that urges the bypass valve body 20 in the direction to close the second upstream passage 122. When the urging force of the bypass valve urging portion 22 decreases, the bypass valve urging portion 22 can be easily downsized accordingly, and the load applied to the cam 29 and the motor 24 can be reduced.

Second Embodiment

Next, a second embodiment will be described. The present embodiment will mainly describe differences from the first embodiment. In addition, the same or equivalent parts as those in the embodiment described above will be omitted or simplified. The same applies to the description of embodiments to be described later.

As illustrated in FIG. 16, in the present embodiment, the attachment angle of the EGR valve body 14 with respect to the EGR valve shaft 15 is rotated by 90 degrees about the EGR valve axis CLa as compared with the first embodiment. As illustrated in (a) in FIG. 16, when the EGR valve body 14 is at the reference rotational position, the EGR valve body 14 fully opens the downstream passage 123, unlike the first embodiment.

The EGR valve urging portion 16 (see FIG. 3) of the present embodiment is similar to that of the first embodiment. That is, the EGR valve urging portion 16 constantly urges the EGR valve body 14 via the EGR valve shaft 15 so that the EGR valve body 14 returns to the reference rotational position. Therefore, when the motor 24 is not energized and is not driven, the EGR valve body 14 is returned to the reference rotational position of the EGR valve body 14 by the urging force of the EGR valve urging portion 16.

FIG. 16 illustrates each state of the valve device 10 similarly to FIG. 5. That is, (a) in FIG. 16 illustrates the valve device 10 when the EGR valve body 14 is at the reference rotational position, and (c) in FIG. 16 illustrates the valve device 10 when the EGR valve body 14 is at the +90-degree rotational position. (b) in FIG. 16 illustrates the valve device 10 when the EGR valve body 14 is at an intermediate position between these rotational positions. (e) in FIG. 16 illustrates the valve device 10 when the EGR valve body 14 is at the −90-degree rotational position, and (d) in FIG. 16 illustrates the valve device 10 when the EGR valve body 14 is at an intermediate position between the reference rotational position and the −90-degree rotational position.

For example, as illustrated in (c) and (e) in FIG. 16, the EGR valve body 14 fully closes the downstream passage 123 even in a case where the EGR valve body 14 is at the +90-degree rotational position or at the −90-degree rotational position. As the rotation amount (in other words, the rotation angle) of the EGR valve body 14 from the reference rotational position increases, the opening degree of the downstream passage 123 decreases, and the EGR flow rate flowing from the downstream passage 123 to the intake passage 72 (see FIG. 1) decreases accordingly.

(1) As described above, according to the present embodiment, the EGR valve body 14 is rotationally operated by the motor 24, and is urged to return to the reference rotational position when the motor 24 is not driven. When the EGR valve body 14 is at the reference rotational position, the downstream passage 123 is fully opened. The EGR gas can thus flow through the downstream passage 123 at the time of starting the engine 71 (see FIG. 1). Therefore, it is possible to prevent the EGR valve body 14 from being unable to rotationally operate due to freezing of condensed water at the time of starting the engine 71.

The present embodiment is similar to the first embodiment except for the above description. In the present embodiment, the same effects as those of the first embodiment can be obtained from the same configuration as that of the first embodiment.

Third Embodiment

Next, a third embodiment will be described. The present embodiment will mainly describe differences from the first embodiment.

Figure 17A:
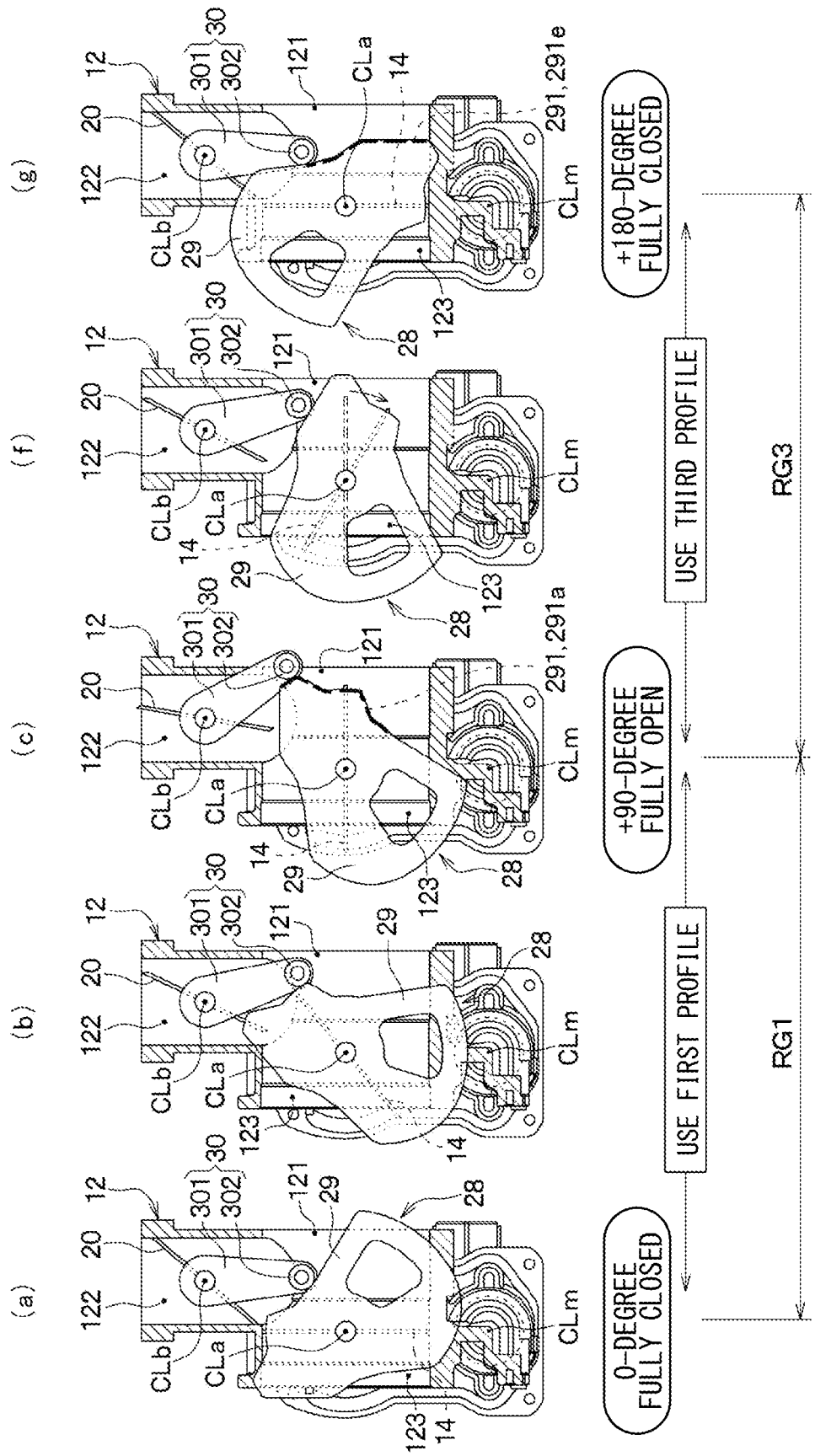
FIG. 17A is cross-sectional views similar to FIG. 2 and corresponding to FIG. 5, and illustrates modes of a valve device that change with a rotational operation in which an EGR valve body rotates from the reference rotational position to one side in the EGR valve circumferential direction, in a third embodiment.
Figure 17B:
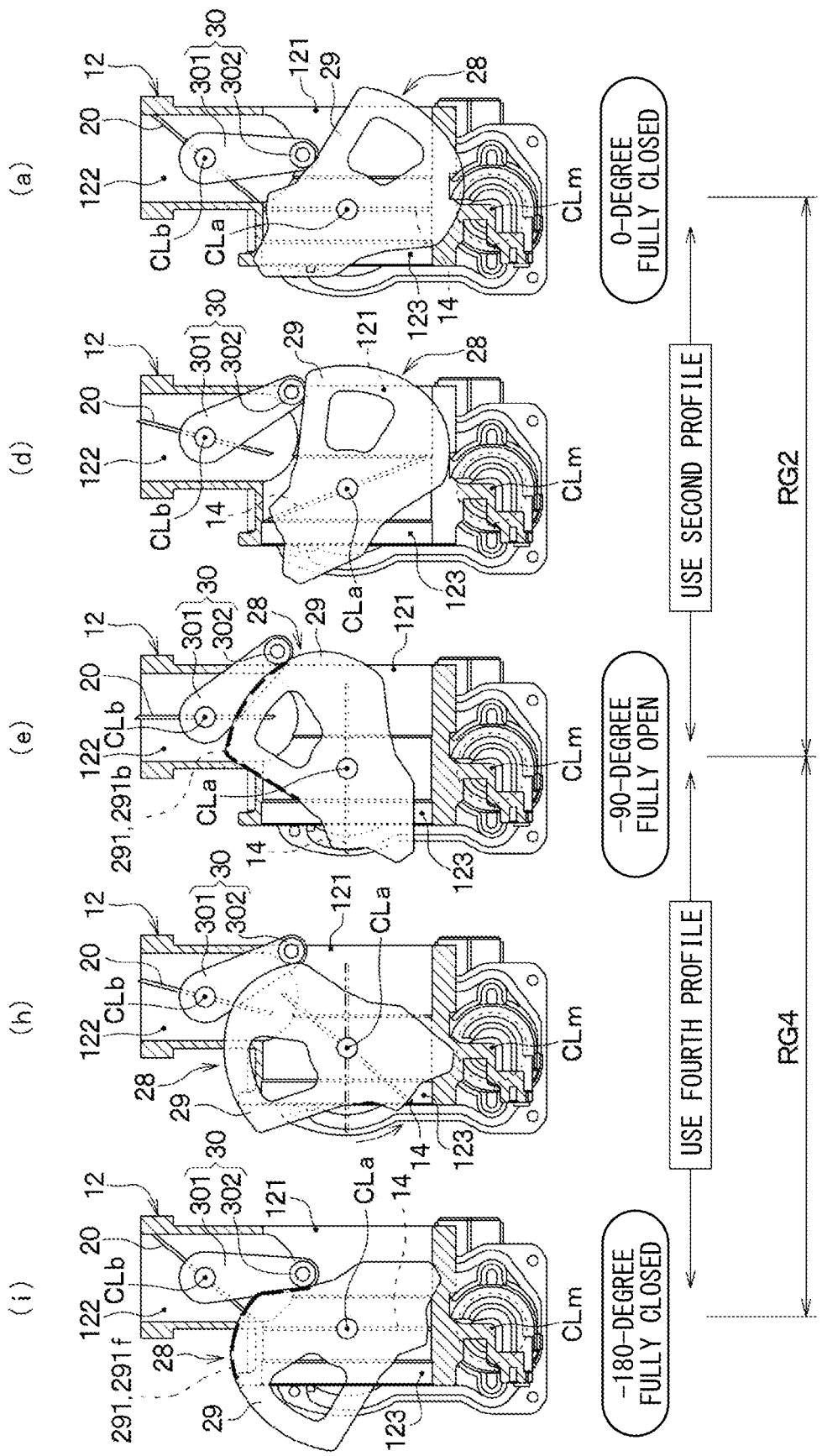
FIG. 17B is cross-sectional views similar to FIG. 2 and corresponding to FIG. 5, and illustrates modes of the valve device that change with a rotational operation in which the EGR valve body rotates from the reference rotational position to the other side in the EGR valve circumferential direction, in the third embodiment.

As illustrated in FIGS. 17A and 17B, in the present embodiment, the movable range of the EGR valve body 14 is wider than that of the first embodiment. Specifically, the EGR valve body 14 rotates from the reference rotational position of the EGR valve body 14 to one side in the EGR valve circumferential direction Dac by 180 degrees, and also rotates from the reference rotational position to the other side in the EGR valve circumferential direction Dac by 180 degrees.

Also in the present embodiment, the reference rotational position of the EGR valve body 14 is referred to as "0-degree rotational position of EGR valve body 14", as in the first embodiment. The rotational position obtained by rotating the EGR valve body 14 from the reference rotational position to one side in the EGR valve circumferential direction Dac by 90 degrees is referred to as "+90-degree rotational position", and the rotational position obtained by rotating the EGR valve body 14 from the reference rotational position to the other side in the EGR valve circumferential direction Dac by 90 degrees is referred to as "−90-degree rotational position". In addition, in the present embodiment, the rotational position rotated from the reference rotational position of the EGR valve body 14 to one side in the EGR valve circumferential direction Dac by 180 degrees is referred to as "+180-degree rotational position". The rotational position rotated from the reference rotational position of the EGR valve body 14 to the other side in the EGR valve circumferential direction Dac by 180 degrees is referred to as "−180-degree rotational position".

(a) in FIG. 17A and (a) in FIG. 17B both illustrate the same state of the valve device 10, and specifically, illustrate the valve device 10 when the EGR valve body 14 is at the reference rotational position. (c) in FIG. 17A illustrates the valve device 10 when the EGR valve body 14 is at the +90-degree rotational position, and (b) in FIG. 17A illustrates the valve device 10 when the EGR valve body 14 is at an intermediate position between the reference rotational position and the +90-degree rotational position. (g) in FIG. 17A illustrates the valve device 10 when the EGR valve body 14 is at the +180-degree rotational position, and (f) in FIG. 17A illustrates the valve device 10 when the EGR valve body 14 is at an intermediate position between the +90-degree rotational position and the +180-degree rotational position.

(e) in FIG. 17B illustrates the valve device 10 when the EGR valve body 14 is at the −90-degree rotational position, and (d) in FIG. 17B illustrates the valve device 10 when the EGR valve body 14 is at an intermediate position between the reference rotational position and the −90-degree rotational position. (i) in FIG. 17B illustrates the valve device 10 when the EGR valve body 14 is at the −180-degree rotational position, and (h) in FIG. 17B illustrates the valve device 10 when the EGR valve body 14 is at an intermediate position between the −90-degree rotational position and the −180-degree rotational position.

As illustrated in (a) to (c) in FIG. 17A, in a case where the EGR valve body 14 rotates within the first rotational range RG1, the first profile 291a of the cam track 291 is used as in the first embodiment. As illustrated in (a), (d), and (e) in FIG. 17B, in a case where the EGR valve body 14 rotates within the second rotational range RG2, the second profile 291b of the cam track 291 is used as in the first embodiment.

The cam track 291 of the present embodiment includes a third profile 291e and a fourth profile 291f in addition to the first profile 291a and the second profile 291b. The first to fourth profiles 291a, 291b, 291e, and 291f are profiles of the cam 29 connected in series in the order of the fourth profile 291f, the second profile 291b, the first profile 291a, and the third profile 291e.

As illustrated in (c), (f), and (g) in FIG. 17A, in a case where the EGR valve body 14 rotates within a third rotational range RG3, the driven rotating portion 30 rotates in an interlocking manner with the rotational operation of the cam 29 while causing the roller 302 to follow the third profile 291e of the cam 29. On the other hand, as illustrated in (e), (h), and (i) in FIG. 17B, in a case where the EGR valve body 14 rotates within a fourth rotational range RG4, the driven rotating portion 30 rotates in an interlocking manner with the rotational operation of the cam 29 while causing the roller 302 to follow the fourth profile 291f of the cam 29. The third rotational range RG3 of the EGR valve body 14 is a rotational range from the +90-degree rotational position to the +180-degree rotational position of the EGR valve body 14. The fourth rotational range RG4 of the EGR valve body 14 is a rotational range from the −90-degree rotational position to the −180-degree rotational position of the EGR valve body 14.

The rotational positions of the EGR valve body 14 and the rotational positions of the bypass valve body 20 illustrated in (a) to (e) in FIGS. 17A and 17B are the same as the rotational positions of the EGR valve body 14 and the rotational positions of the bypass valve body 20 illustrated in (a) to (e) in FIG. 5, respectively.

For example, as illustrated in (g) and (i) in FIGS. 17A and 17B, the EGR valve body 14 fully closes the downstream passage 123 even in a case where the EGR valve body 14 is at the +180-degree rotational position or at the −180-degree rotational position. At this time, the bypass valve body 20 fully closes the second upstream passage 122.

As described above, for example, in a case where the EGR valve body 14 rotates from the reference rotational position to one side around the EGR valve axis CLa, every time the EGR valve body 14 rotates 90 degrees from the reference rotational position, the opening degree of the downstream passage 123 changes from one of a fully closed state and a fully open state of the downstream passage 123 to the other. At the same time, every time the EGR valve body 14 rotates 90 degrees from the reference rotational position, the passage opening degree characteristic that is the relationship between the opening degree of the second upstream passage 122 and the opening degree of the downstream passage 123 is also switched according to the first profile 291a and the third profile 291e of the cam 29.

In a case where the EGR valve body 14 rotates from the reference rotational position to the other side around the EGR valve axis CLa, every time the EGR valve body rotates 90 degrees from the reference rotational position, the opening degree of the downstream passage 123 changes from one of the fully closed state and the fully open state of the downstream passage 123 to the other.

At the same time, every time the EGR valve body 14 rotates 90 degrees from the reference rotational position, the passage opening degree characteristic is also switched according to the second profile 291b and the fourth profile 291f of the cam 29.

(1) As described above, according to the present embodiment, the relationship between the opening degree of the downstream passage 123, which changes from one of the fully closed state and the fully open state of the downstream passages 123 to the other, and the opening degree of the second upstream passage 122, is switched every time the EGR valve body 14 rotates 90 degrees from the reference rotational position to one side around the EGR valve axis CLa. The relationship between the opening degree of the downstream passage 123, which changes from one of the fully closed state and the fully open state of the downstream passages 123 to the other, and the opening degree of the second upstream passage 122 is also switched every time the EGR valve body 14 rotates 90 degrees from the reference rotational position to the other side around the EGR valve axis CLa. Therefore, the valve device 10 can have four types of relationships between the opening degree of the downstream passage 123 and the opening degree of the second upstream passage 122 that are interlocked with each other.

The present embodiment is similar to the first embodiment except for the above description. In the present embodiment, the same effects as those of the first embodiment can be obtained from the same configuration as that of the first embodiment.

Although the present embodiment is a modification based on the first embodiment, the present embodiment can be combined with the second embodiment described above.

Fourth Embodiment

Next, a fourth embodiment will be described. The present embodiment will mainly describe differences from the first embodiment.

Figure 18:
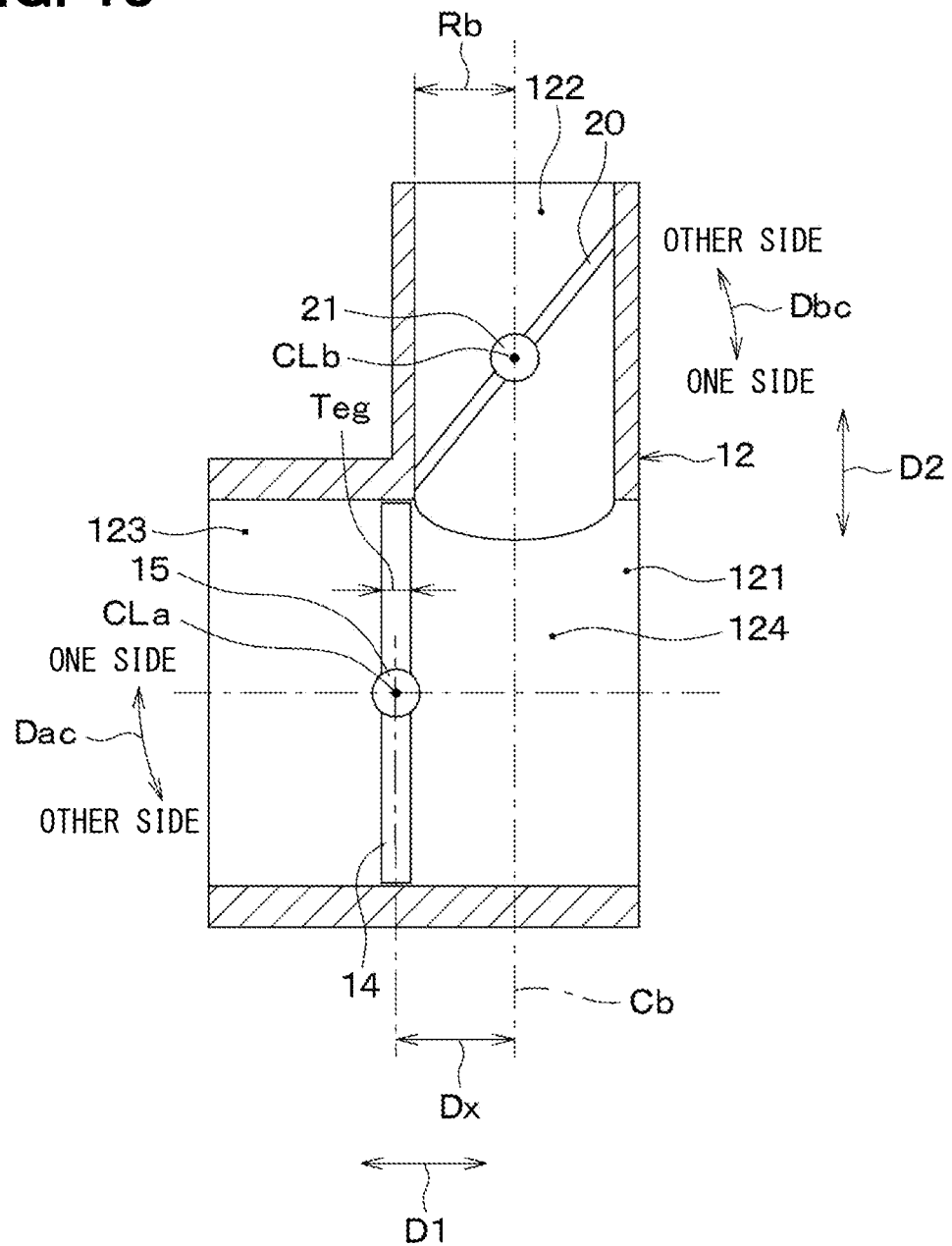
FIG. 18 is a schematic partial cross-sectional view of a housing of a valve device taken along a line perpendicular to an EGR valve axis in a simplified manner, omitting an interlocking portion in a fourth embodiment, and corresponding to FIG. 4.
Figure 19:
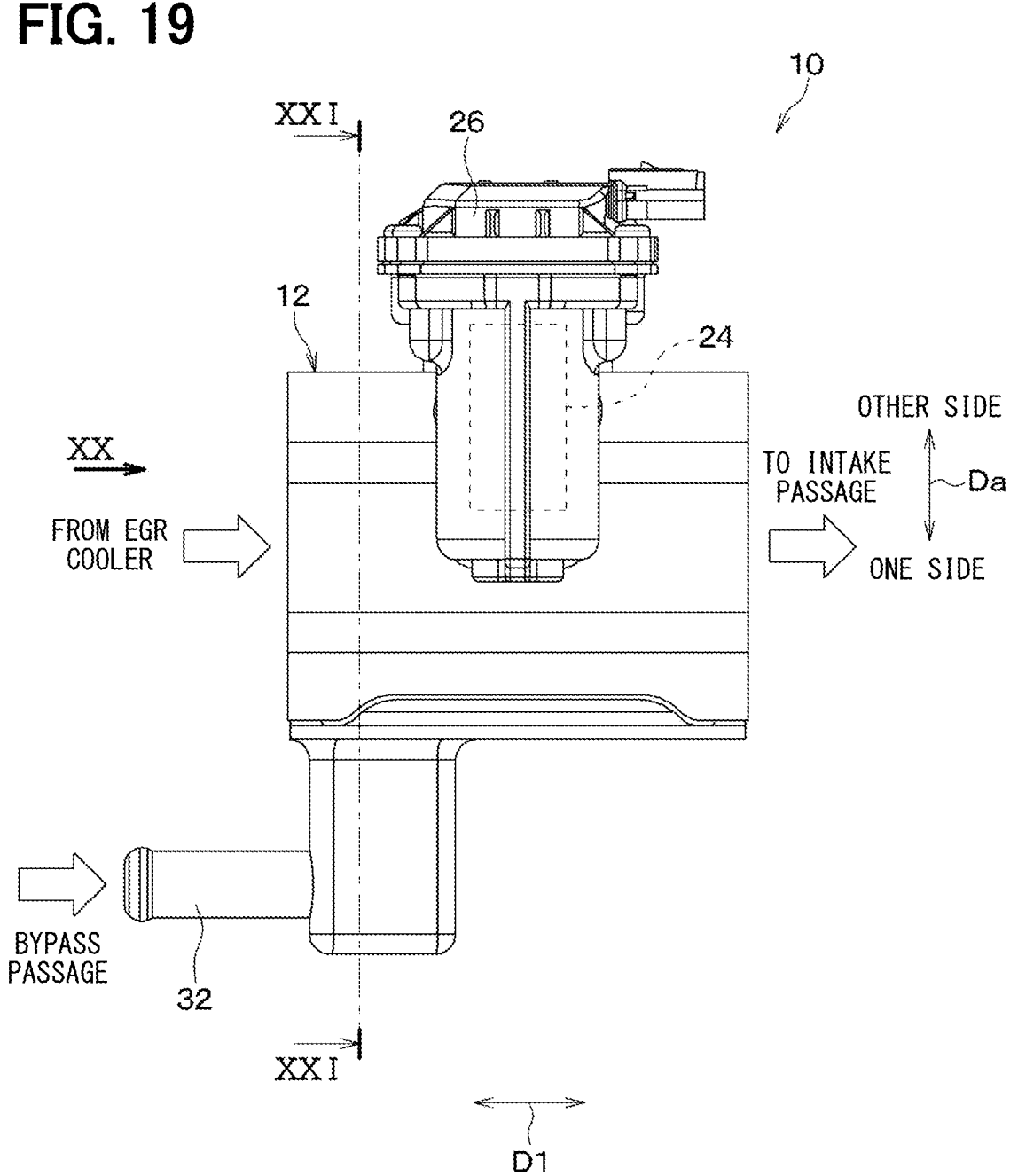
FIG. 19 is a front view of a valve device of a fifth embodiment.
Figure 20:
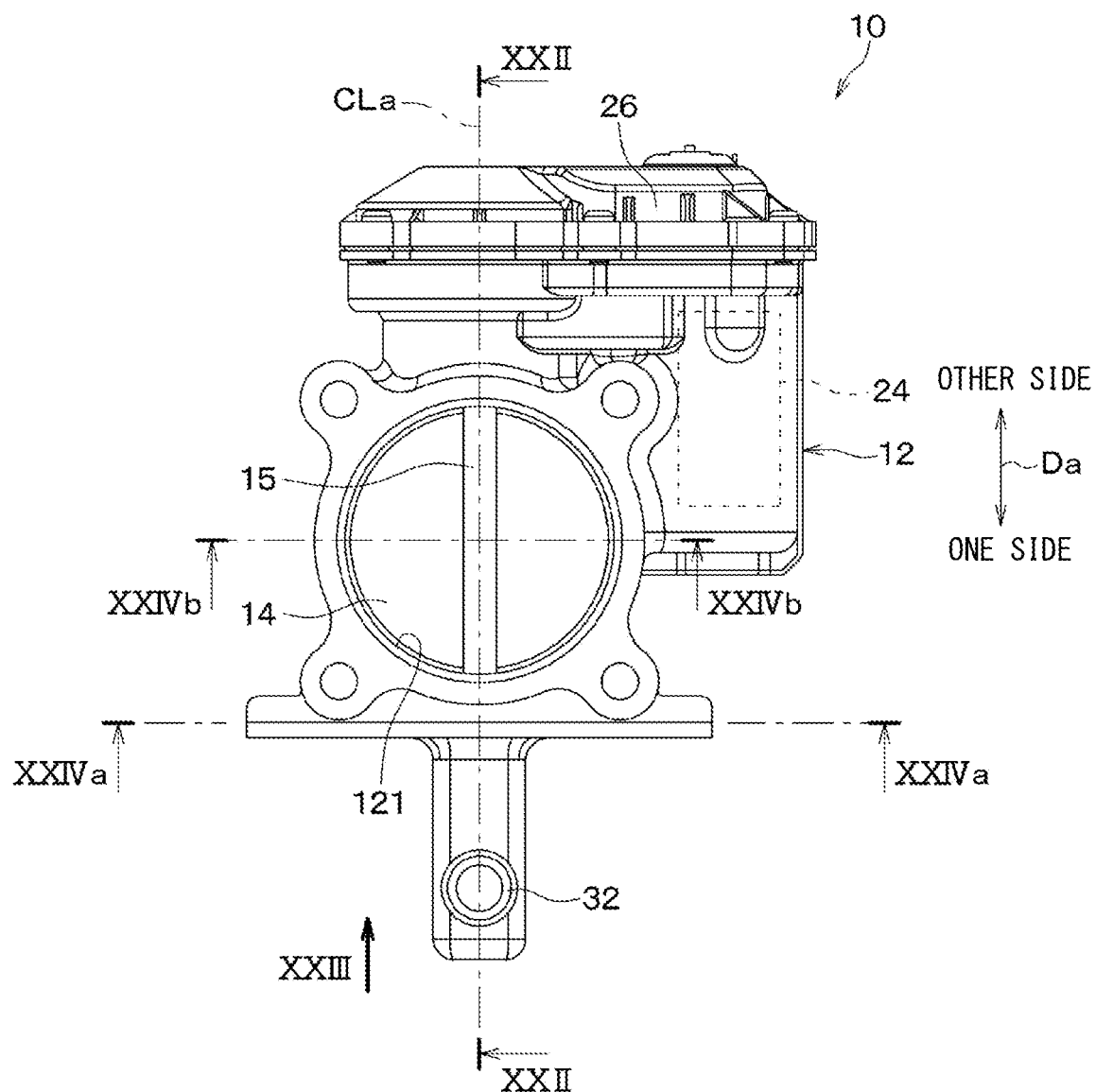
FIG. 20 is a view on arrow XX in FIG. 19 in the fifth embodiment, and is a left side view of the valve device.
Figure 21:
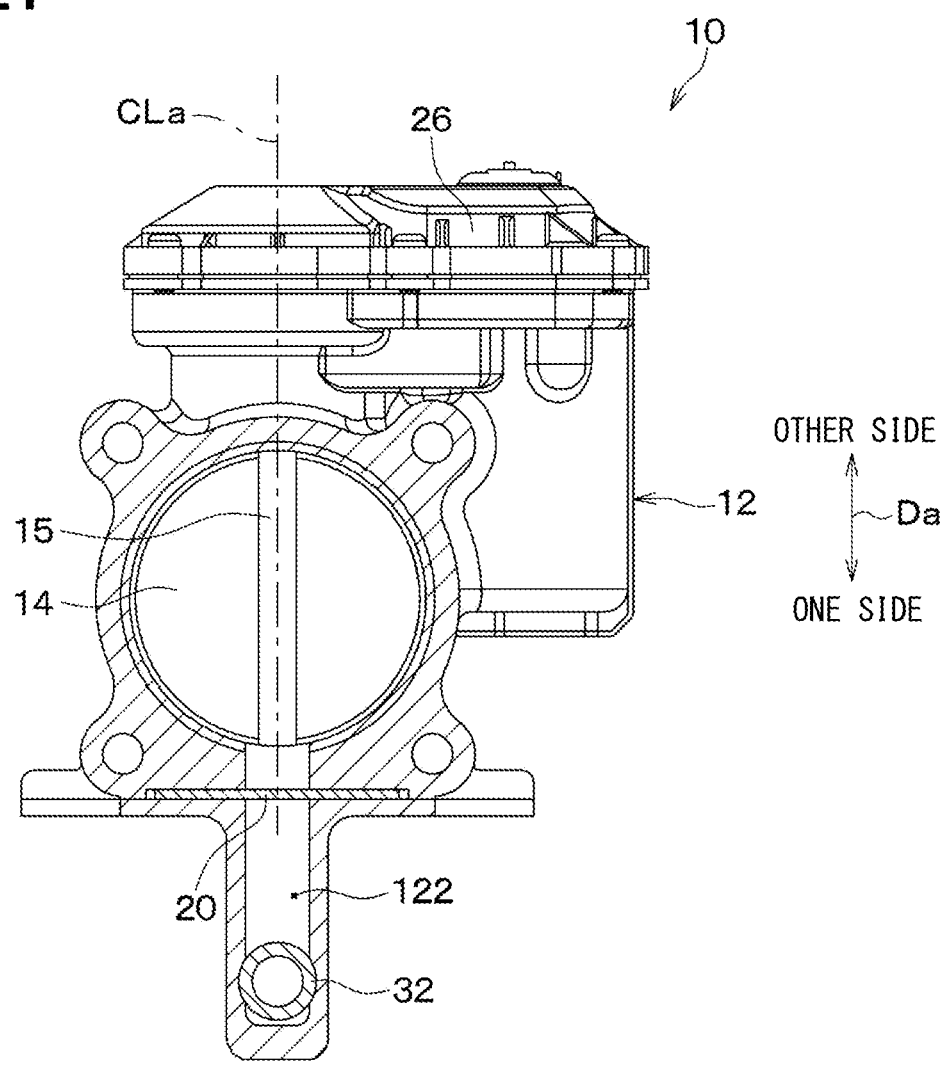
FIG. 21 is a cross-sectional view taken along line XXI-XXI of FIG. 19 in the fifth embodiment.

As illustrated in FIG. 18, also in the present embodiment, the downstream passage 123 is disposed in a direction perpendicular to the second upstream passage 122 as viewed in a direction parallel to the EGR valve axis CLa, as in the first embodiment.

However, in the present embodiment, as viewed in the direction parallel to the EGR valve axis CLa, a center-to-center distance Dx between the EGR valve axis CLa and a center Cb of the second upstream passage 122 in the first passage direction D1 along the direction of the downstream passage 123 is equal to or larger than the radius Rb of the second upstream passage 122. The center-to-center distance Dx is equal to or less than the sum of a thickness Teg of the EGR valve body 14 and the radius Rb of the second upstream passage 122. In short, in FIG. 18, the center-to-center distance Dx in the first passage direction D1, the radius Rb of the second upstream passage 122, and the thickness Teg of the EGR valve body 14 have a relationship of "Rb Dx Rb+Teg".

(1) Since the EGR valve body 14 and the bypass valve body 20 can be disposed close to each other, the valve device 10 can be downsized. The thickness Teg used in the relational expression "Rb Dx Rb+Teg" is, for example, the maximum thickness of the EGR valve body 14.

The present embodiment is similar to the first embodiment except for the above description. In the present embodiment, the same effects as those of the first embodiment can be obtained from the same configuration as that of the first embodiment.

Although the present embodiment is a modification based on the first embodiment, the present embodiment can be combined with the second embodiment or the third embodiment described above.

Fifth Embodiment

Next, a fifth embodiment will be described. The present embodiment will mainly describe differences from the first embodiment.

As illustrated in FIGS. 19 to 22, in the present embodiment, the bypass valve body 20 is not a butterfly valve body but a disk valve body that has a flat plate shape and slides in a direction along the flat plate shape to open and close the second upstream passage 122. In this respect, the present embodiment is different from the first embodiment.

Specifically, also in the present embodiment, the second upstream passage 122 includes the downstream end of the bypass passage 75 (see FIG. 1) and constitutes a part of the bypass passage 75, as in the first embodiment. However, in the present embodiment, the direction of the second upstream passage 122 is different from that in the first embodiment. The second upstream passage 122 of the present embodiment is a passage linearly extending along the valve shaft direction Da. The EGR gas that has bypassed the EGR cooler 80 (see FIG. 1) flows into the second upstream passage 122 via the bypass pipe 32 connected to the housing 12.

Figure 22:
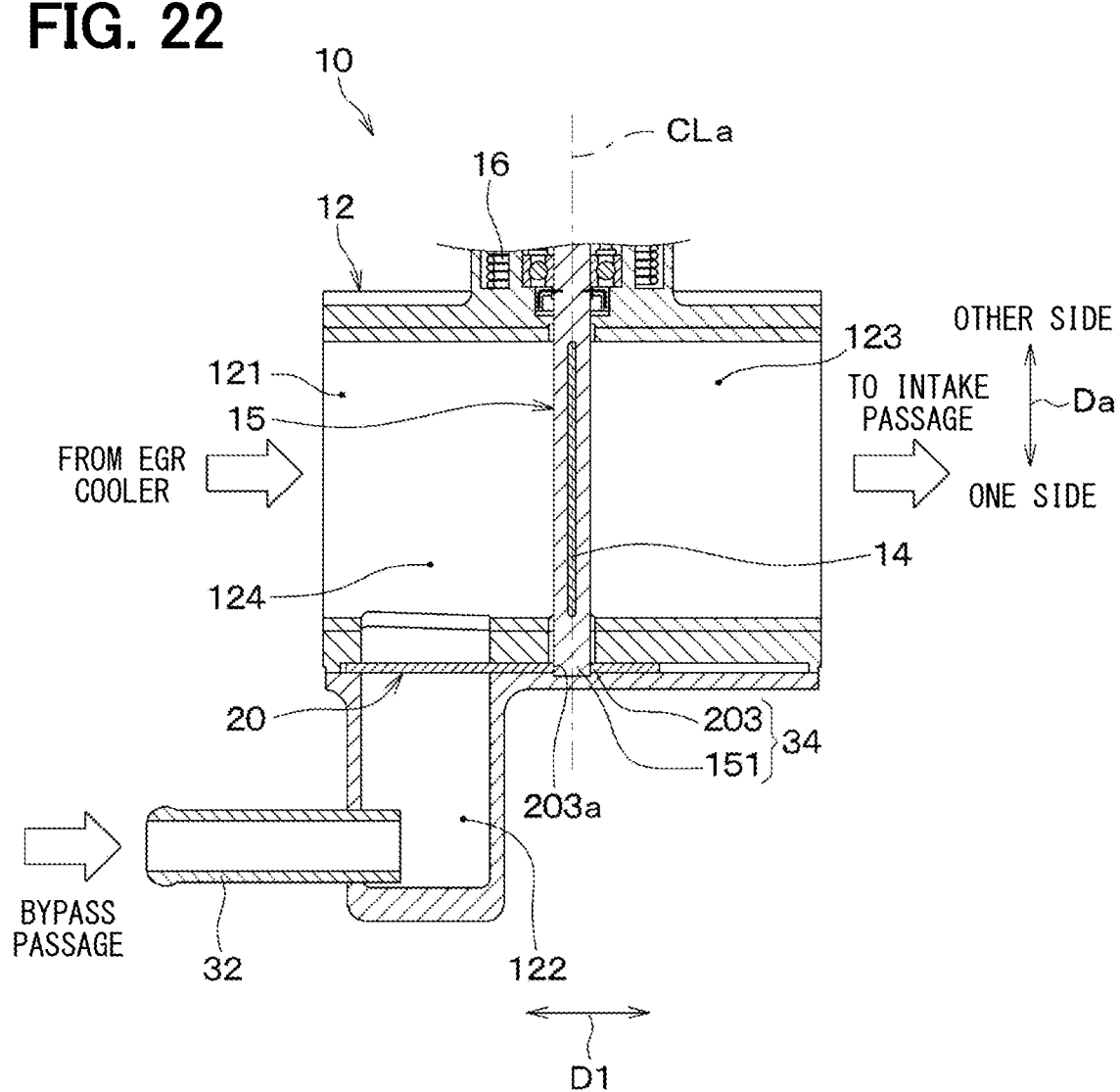
FIG. 22 is a cross-sectional view taken along line XXII-XXII of FIG. 20 in the fifth embodiment.
Figure 23:
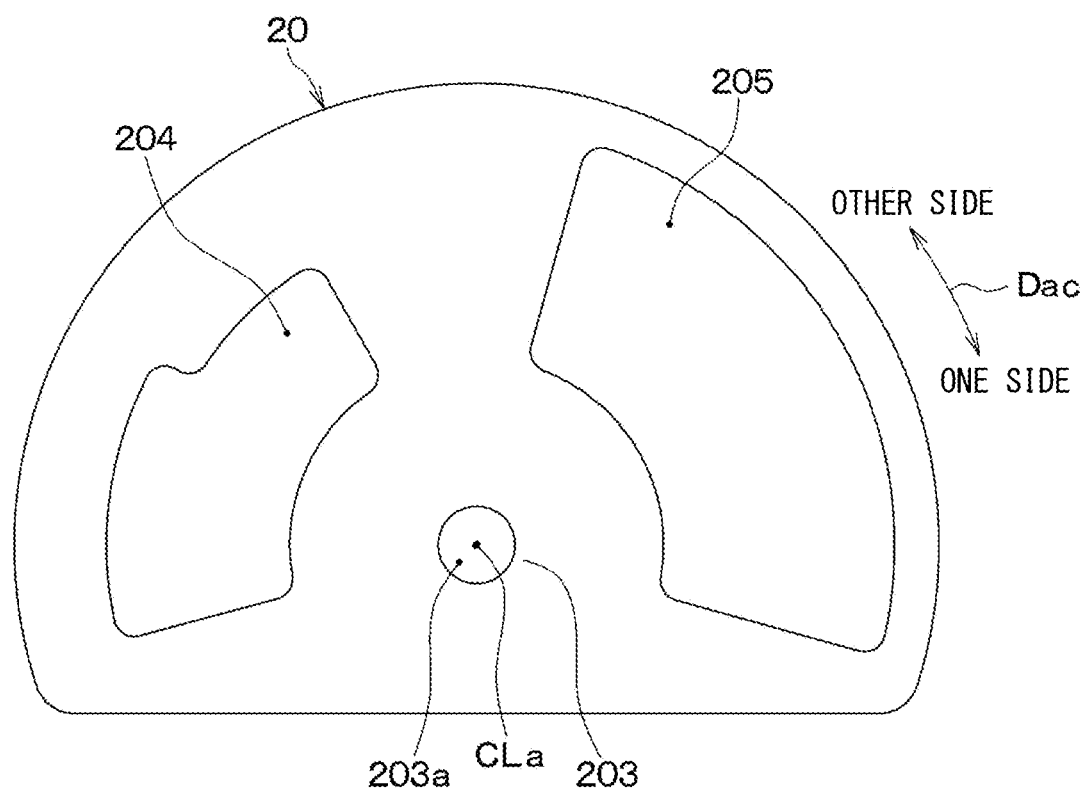
FIG. 23 is a diagram illustrating a bypass valve body alone in the fifth embodiment, and is a view on arrow XXIII in FIG. 20.

As illustrated in FIGS. 22 and 23, the bypass valve body 20 of the present embodiment is formed of a plate material that is formed in a flat plate shape and has a thickness in the valve shaft direction Da. That is, the bypass valve body 20 has a shape expanding across the second upstream passage 122.

The bypass valve body 20 includes a connecting portion 203 in which a connection hole 203a penetrating the bypass valve body 20 is formed. One end portion 151, which is an end portion of the EGR valve shaft 15 on one side in the valve shaft direction Da, is fitted into the connection hole 203a, and the bypass valve body 20 is connected to the EGR valve shaft 15 at the connecting portion 203 of the bypass valve body 20 so as not to be rotated relative to the EGR valve shaft 15.

The bypass valve body 20 of the present embodiment rotates around the EGR valve axis CLa integrally with the EGR valve body 14 and the EGR valve shaft 15. That is, the bypass valve body 20 rotates together with the EGR valve shaft 15 to slide in a direction intersecting the second upstream passage 122. Specifically, the bypass valve body 20 slides in the EGR valve circumferential direction Dac with respect to the second upstream passage 122.

The one end portion 151 of the EGR valve shaft 15 and the connecting portion 203 of the bypass valve body 20 function as an interlocking portion 34 that interlocks the bypass valve body 20 with the rotational operation of the EGR valve body 14. The valve device 10 of the present embodiment does not include the bypass valve shaft 21, the bypass valve urging portion 22, and the interlocking portion 28 (see FIG. 3) configured as the cam link mechanism.

In the bypass valve body 20 of the present embodiment, a first through-hole 204 and a second through-hole 205 are formed. The second through-hole 205 is disposed on one side in the EGR valve circumferential direction Dac of the first through-hole 204.

Figure 24:
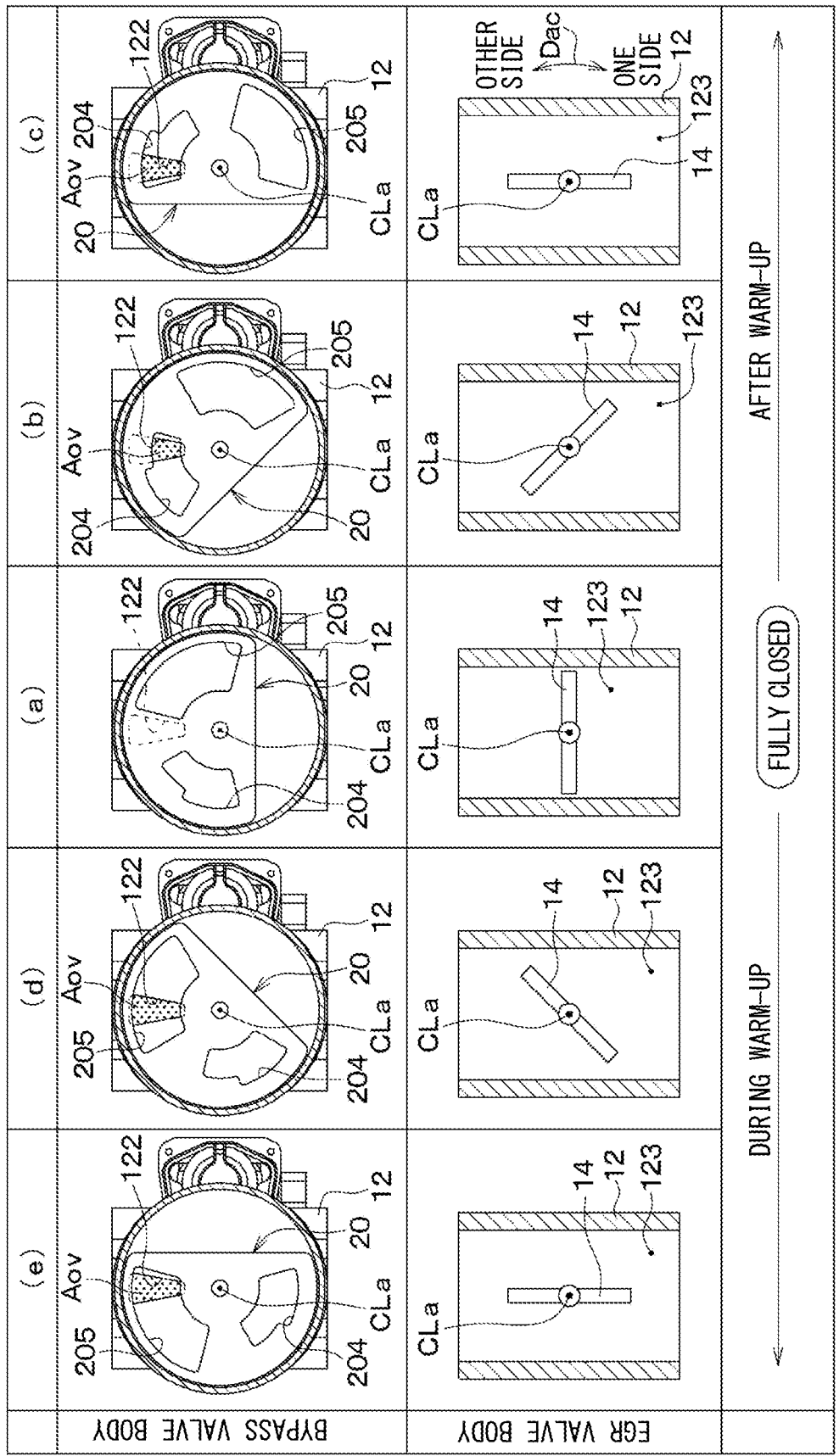
FIG. 24 is diagrams each illustrating an attitude of an EGR valve body and an attitude of the bypass valve body that change with the rotational operation of the EGR valve body in the fifth embodiment.

As illustrated in FIGS. 22 and 24, the bypass valve body 20 opens the second upstream passage 122 by causing the first through-hole 204 or the second through-hole 205 to overlap the second upstream passage 122 as the bypass valve body 20 slides. On the other hand, the bypass valve body 20 fully closes the second upstream passage 122 by removing both the first through-hole 204 and the second through-hole 205 from the second upstream passage 122 as the bypass valve body 20 slides. The state where the second upstream passage 122 is fully closed is illustrated in (a) in FIG. 24.

For example, the EGR valve body 14 and the bypass valve body 20 of the present embodiment rotate as illustrated in (a) to (e) in FIG. 24. (a) in FIG. 24 illustrates the attitude of the EGR valve body 14 and the attitude of the bypass valve body 20 when the EGR valve body 14 is at the reference rotational position. (c) in FIG. 24 illustrates the attitude of the EGR valve body 14 and the attitude of the bypass valve body 20 when the EGR valve body 14 is at the +90-degree rotational position. (b) in FIG. 24 illustrates the attitude of the EGR valve body 14 and the attitude of the bypass valve body 20 when the EGR valve body 14 is at an intermediate position between the reference rotational position and the +90-degree rotational position. (e) in FIG. 24 illustrates the attitude of the EGR valve body 14 and the attitude of the bypass valve body 20 when the EGR valve body 14 is at the −90-degree rotational position. (d) in FIG. 24 illustrates the attitude of the EGR valve body 14 and the attitude of the bypass valve body 20 when the EGR valve body 14 is at an intermediate position between the reference rotational position and the −90-degree rotational position.

As illustrated in (a) to (e) in FIG. 24, as the amount of overlap of the first through-hole 204 or the second through-hole 205 of the bypass valve body 20 and the second upstream passage 122 increases, the opening degree of the second upstream passage 122 increases accordingly. The amount of overlap of the through-holes 204 and 205 and the second upstream passage 122 is represented as, for example, the size of a through-hole overlapping region Aov with dot hatching. In (a) to (e) in FIG. 24, the attitude of the bypass valve body 20 is represented by a cross-section taken along line XXIVa-XXIVa of FIG. 20, and the attitude of the EGR valve body 14 is represented by a cross-section taken along line XXIVb-XXIVb of FIG. 20.

The content of FIG. 6 described above is similar in the present embodiment. Also in the present embodiment, after the warm-up of the engine 71, the EGR valve body 14 is rotationally operated within the first rotational range RG1 (see FIG. 6), as in the first embodiment. That is, (a) to (c) in FIG. 24 illustrate the attitude of the EGR valve body 14 and the attitude of the bypass valve body 20 after the warm-up of the engine 71. During the warm-up of the engine 71, the EGR valve body 14 is rotationally operated within the second rotational range RG2 (see FIG. 6). That is, (a), (d), and (e) in FIG. 24 illustrate the attitude of the EGR valve body 14 and the attitude of the bypass valve body 20 during the warm-up of the engine 71.

Since the passage opening degree characteristic of the present embodiment is similar to that of the first embodiment, it can be said that the interlocking portion 34 of the present embodiment also has the interlocking structure similarly to the interlocking portion 28 of the first embodiment. That is, it can be said that the interlocking portion 34 has an interlocking structure capable of causing the opening degree of the second upstream passage 122 to be interlocked with the opening degree of the downstream passage 123 in a non-linear relationship when both the second upstream passage 122 and the downstream passage 123 are opened.

Also in the present embodiment, for example, as illustrated in (a) in FIG. 24, the EGR valve body 14 fully closes the downstream passage 123 in a case where the EGR valve body 14 is at the reference rotational position. Furthermore, as illustrated in (c) and (e) in FIG. 24, the EGR valve body 14 fully opens the downstream passage 123 even in a case where the EGR valve body 14 is at the +90-degree rotational position or at the −90-degree rotational position.

In the present embodiment, the EGR valve urging portion 16 illustrated in FIG. 22 constantly urges the EGR valve body 14 via the EGR valve shaft 15 so that the EGR valve body 14 returns to the reference rotational position, as in the first embodiment. That is, the EGR valve urging portion 16 constantly urges the EGR valve body 14 and the bypass valve body 20 so that the EGR valve body 14 and the bypass valve body 20 take the attitude illustrated in (a) in FIG. 24. In the attitude of the bypass valve body 20 illustrated in (a) in FIG. 24, the bypass valve body 20 fully closes the second upstream passage 122. At the same time, the second through-hole 205 is located on one side in the EGR valve circumferential direction Dac (see FIG. 23) of the second upstream passage 122, and the first through-hole 204 is located on the other side in the EGR valve circumferential direction Dac of the second upstream passage 122.

(1) As described above, according to the present embodiment, the bypass valve body 20 is formed of a plate material that extends across the second upstream passage 122 and includes the first through-hole 204 and the second through-hole 205. The bypass valve body 20 rotates integrally with the EGR valve body 14 to slide in a direction intersecting the second upstream passage 122, and causes the first through-hole 204 or the second through-hole 205 to overlap the second upstream passage 122 in accordance with the sliding operation, thereby opening degree the second upstream passage 122. As the amount of overlap of the first through-hole 204 or the second through-hole 205 of the bypass valve body 20 and the second upstream passage 122 increases, the opening degree of the second upstream passage 122 increases accordingly.

As a result, the number of components constituting the valve device 10 can be reduced.

The present embodiment is similar to the first embodiment except for the above description. In the present embodiment, the same effects as those of the first embodiment can be obtained from the same configuration as that of the first embodiment.

Other Embodiments (1) In each of the embodiments described above, the fuel used in the internal combustion engine system 70 illustrated in FIG. 1 is hydrogen, but this is an example. The internal combustion engine system 70 may use, for example, fossil fuel such as gasoline as fuel for generating power.

(2) In the first embodiment described above, as illustrated in FIGS. 4 and 5, the EGR valve body 14 is disposed at a position where a part of the EGR valve body 14 temporarily enters the junction 124 when the EGR valve body 14 rotates, but this is an example. For example, depending on the shape of the EGR valve body 14 or the movable range of the EGR valve body 14, it is conceivable that a part of the EGR valve body 14 is always within the junction 124.

(3) In the first embodiment described above, as illustrated in FIG. 2, the cam track 291 is provided by a part of the peripheral edge of the cam 29, but may be provided by, for example, a groove or a long hole provided in the cam 29 instead of the peripheral edge of the cam 29.

(4) The present disclosure is not limited to the embodiments described above, and various modifications can be made. In addition, the embodiments described above are not unrelated to each other, and can be appropriately combined unless the combination is obviously impossible.

In addition, in each of the above embodiments, it goes without saying that the elements constituting the embodiments are not necessarily essential except for a case where it is explicitly stated that the elements are particularly essential and a case where the elements are considered to be obviously essential in principle. In each of the above embodiments, when a numerical value such as the number, numerical value, amount, range, or the like of the constituent elements of the embodiment is mentioned, the numerical value is not limited to a specific number unless otherwise specified as essential or obviously limited to the specific number in principle. In each of the above embodiments, when the material, shape, positional relationship, and the like of the constituent elements and the like are referred to, the material, the shape, the positional relationship, and the like are not limited unless otherwise specified or limited to specific materials, shapes, positional relationships, and the like in principle.

What is claimed is:

1. A valve device configured to increase or decrease a flow rate of EGR gas, the valve device comprising:
    a housing that includes a first upstream passage into which the EGR gas cooled by an EGR cooler flows, a second upstream passage into which the EGR gas that bypasses the EGR cooler flows, and a downstream passage connected downstream with respect to the first upstream passage and the second upstream passage;
    a bypass valve body that opens and closes the second upstream passage;
    an EGR valve body that is provided in the downstream passage and rotates around an EGR valve axis to open and close the downstream passage; and
    an interlocking portion that interlocks the bypass valve body with a rotational operation of the EGR valve body, wherein
    a first case is defined as the EGR valve body rotating around the EGR valve axis from a reference rotational position, which is predetermined, to one side,
    a second case is defined as the EGR valve body rotating around the EGR valve axis from the reference rotational position to an other side,
    the EGR valve body is configured such that a relationship between a rotation amount from a reference rotational position, which is predetermined, and an opening degree of the downstream passage is same in a first case where the EGR valve body rotates around the EGR valve axis from the reference rotational position to one side and a second case where the EGR valve body rotates around the EGR valve axis from the reference rotational position to an other side, and
    the interlocking portion has a structure configured to interlock an opening degree of the second upstream passage with the opening degree of the downstream passage in a non-linear relationship when the second upstream passage and the downstream passage are open.

2. The valve device according to claim 1, wherein
    the EGR valve body fully closes or fully opens the downstream passage at the reference rotational position, and
    a relationship between the opening degree of the second upstream passage and the opening degree of the downstream passage that change in an interlocking manner with each other is different between the first case and the second case.

3. The valve device according to claim 1, wherein
    the bypass valve body is provided in the second upstream passage and rotates around a bypass valve axis to open and close the second upstream passage,
    the interlocking portion includes a cam that rotates with the EGR valve body and has a cam track, and a driven rotating portion that rotates with the bypass valve body and has a cam follower, and
    the driven rotating portion rotates in an interlocking manner with a rotational operation of the cam while causing the cam follower to follow the cam track.

4. The valve device according to claim 1, wherein
    the bypass valve body is provided in the second upstream passage and rotates around a bypass valve axis to open and close the second upstream passage,
    the interlocking portion includes a cam that rotates with the EGR valve body and has a cam track, and a driven rotating portion that rotates with the bypass valve body and has a cam follower, the driven rotating portion rotates in an interlocking manner with a rotational operation of the cam while causing the cam follower to follow the cam track, the EGR valve body has a plate shape with a thickness in a direction perpendicular to the EGR valve axis, and, in a view parallel to the EGR valve axis, the downstream passage is disposed in a direction perpendicular to the second upstream passage, the bypass valve axis is located at a center of a width of the second upstream passage in a direction parallel to a direction of the downstream passage, and a distance between the EGR valve axis and the center of the width of the second upstream passage in the direction parallel to the direction of the downstream passage is equal to or larger than a radius of the second upstream passage, and is equal to or smaller than a sum of a thickness of the EGR valve body and the radius of the second upstream passage.

5. The valve device according to claim 1, wherein
the bypass valve body is provided in the second upstream passage and rotates around a bypass valve axis to open and close the second upstream passage,
the interlocking portion includes a cam that rotates with the EGR valve body and has a cam track, and a driven rotating portion that rotates with the bypass valve body and has a cam follower,
the driven rotating portion rotates in an interlocking manner with a rotational operation of the cam while causing the cam follower to follow the cam track,
the first upstream passage is disposed in a direction intersecting the second upstream passage,
the housing includes a junction connected to each of a gas-flow downstream side of the first upstream passage, a gas-flow downstream side of the second upstream passage, and a gas-flow upstream side of the downstream passage,
the junction is provided as a space in which a space obtained by extending the first upstream passage in a direction of the first upstream passage and a space obtained by extending the second upstream passage in a direction of the second upstream passage overlap each other, and
the EGR valve body is disposed at a position where a part of the EGR valve body at least temporarily enters the junction when the EGR valve body rotates.

6. The valve device according to claim 3, wherein
the cam track includes, as a part of the cam track, a dead zone that does not displace the cam follower even when the cam rotates.

7. The valve device according to claim 3, wherein
when the bypass valve body fully closes the second upstream passage, the bypass valve body always rotates to one side in a circumferential direction of the bypass valve axis.

8. The valve device according to claim 7, wherein
the bypass valve body is urged to rotate to the one side in the circumferential direction of the bypass valve axis, and the bypass valve body fully closes the second upstream passage in an attitude inclined with respect to the second upstream passage.

9. The valve device according to claim 1, wherein
the EGR valve body is rotationally operated by a drive source, is urged to return to the reference rotational position when the drive source is not driven, and fully opens the downstream passage at the reference rotational position.

10. The valve device according to claim 1, wherein
the EGR valve body rotates 180 degrees around the EGR valve axis from the reference rotational position to the one side, and rotates 180 degrees around the EGR valve axis from the reference rotational position to the other side,
a relationship between an opening degree of the downstream passage that changes from one of a fully closed state and a fully open state of the downstream passage to an other and an opening degree of the second upstream passage interlocked with the opening degree of the downstream passage is switched every time the EGR valve body rotates 90 degrees around the EGR valve axis from the reference rotational position to the one side, and is also switched every time the EGR valve body rotates 90 degrees around the EGR valve axis from the reference rotational position to the other side.

11. The valve device according to claim 1, wherein
the bypass valve body has a plate shape that extends in a direction intersecting the second upstream passage and includes a through-hole, and rotates integrally with the EGR valve body to slide in the direction intersecting the second upstream passage,
as the bypass valve body slides, the through-hole overlaps the second upstream passage to open the second upstream passage, and
as an amount of overlap of the through-hole and the second upstream passage increases, an opening degree of the second upstream passage increases accordingly.

* * * * *